(12) United States Patent  
Danilchenko et al.

(10) Patent No.: US 11,778,063 B2
(45) Date of Patent: *Oct. 3, 2023

(54) DISTRIBUTED STANDARDS REGISTRY FOR CLOUD COMPUTING ENVIRONMENTS

(71) Applicant: Schneider Electric USA, Inc., Andover, MA (US)

(72) Inventors: Victor Danilchenko, South Hadley, MA (US); Thomas Whitehill, Westford, MA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,754

(22) Filed: May 25, 2022

(65) Prior Publication Data

US 2022/0311838 A1    Sep. 29, 2022

Related U.S. Application Data

(63) Continuation of application No. 16/972,573, filed as application No. PCT/US2019/035836 on Jun. 6, 2019, now Pat. No. 11,356,526.

(Continued)

(51) Int. Cl.
*H04L 12/00* (2006.01)
*H04L 67/562* (2022.01)
(Continued)

(52) U.S. Cl.
CPC ........ *H04L 67/562* (2022.05); *G06F 16/2255* (2019.01); *G06F 16/245* (2019.01);
(Continued)

(58) Field of Classification Search
CPC ............ H04L 67/2809; H04L 67/1097; H04L 67/104; G06F 16/245; G06F 16/2255; G06F 16/256; G06F 16/27
(Continued)

(56) References Cited

U.S. PATENT DOCUMENTS 9,015,212 B2 * 4/2015 David .................. G06F 3/0644
709/224
9,674,294 B1 * 6/2017 Gonthier ................. H04L 67/08
(Continued)

OTHER PUBLICATIONS

Otto, B., et al. IDS Reference Architecture Model Industrial Data Space. Tech, rep., International Data Space Association and Fraunhofer-Gesellschaft zur Förderung der angewandten Forschung eV, Dortmund, 2018.

(Continued)

*Primary Examiner* — Frantz Coby
(74) *Attorney, Agent, or Firm* — Locke Lord LLP

(57) ABSTRACT

Techniques for providing a distributed standards registry are provided. A DSR system may include a plurality of distributed standards registry participants that are collectively configured to provide control logic for the distributed standards registry using a consensus voting mechanism to make control decisions. The DSR system includes include a distributed ontology model library maintained on the plurality of distributed standards registry participants and storing a plurality of ontology models, and a distributed federation broker registry maintained across the plurality of distributed standards registry participants. A first distributed standards registry participant of the plurality of distributed standards registry participants includes a discovery processor operable to receive and process federation participant queries and a registry processor operable to receive and process registration requests to register the federation broker as providing (Continued)

brokerage services related to a federation service described by one of the plurality of ontology models.

20 Claims, 15 Drawing Sheets

Related U.S. Application Data

(60) Provisional application No. 62/681,438, filed on Jun. 6, 2018.

(51) Int. Cl.
*G06F 16/27* (2019.01)
*G06F 16/245* (2019.01)
*G06F 16/22* (2019.01)
*G06F 16/25* (2019.01)
*H04L 67/104* (2022.01)
*H04L 67/1097* (2022.01)

(52) U.S. Cl.
CPC ........... *G06F 16/256* (2019.01); *G06F 16/27* (2019.01); *H04L 67/104* (2013.01); *H04L 67/1097* (2013.01)

(58) Field of Classification Search
USPC .................................................. 709/217–219
See application file for complete search history.

(56) References Cited

U.S. PATENT DOCUMENTS

| | | | |
|---|---|---|---|
| 10,454,845 B2* | 10/2019 | Medovich | G06F 12/1027 |
| 10,922,284 B1* | 2/2021 | Venkatasubramanian | H04L 63/0807 |
| 10,970,402 B2* | 4/2021 | Verma | G06F 21/602 |
| 11,356,454 B2* | 6/2022 | Gupta | G06F 21/53 |
| 11,356,526 B2* | 6/2022 | Danilchenko | G06F 16/2255 |
| 2017/0060605 A1* | 3/2017 | Huang | G06F 16/13 |
| 2022/0021652 A1* | 1/2022 | Moghe | H04L 63/0236 |

OTHER PUBLICATIONS

Otto, Boris, et al. "Reference Architecture Model. Version 3.0." (2019).

Official Letter from the European Patent Office for European Patent Application No. 19 733 313.1 dated Oct. 13, 2022.

\* cited by examiner

DISTRIBUTED STANDARDS REGISTRY FOR CLOUD COMPUTING ENVIRONMENTS

CROSS-REFERENCE TO RELATED APPLICATIONS

This application for patent is a continuation of U.S. Non-Provisional patent application Ser. No. 16/972,573, entitled "Distributed Standards Registry Methods for Cloud Environments" and filed on Dec. 4, 2020, which is a 35 U.S.C. § 371 National Stage of International Patent Application No. PCT/US2019/035836, entitled "Distributed Standards Registry Methods for Cloud Environments" and filed on Jun. 6, 2019, which claims the benefit of priority to U.S. Provisional Patent Application No. 62/681,438, entitled "Distributed Standards Registry Methods For Cloud Environments" and filed on Jun. 6, 2018, the foregoing applications being incorporated herein by reference in their entirety.

TECHNICAL FIELD

The present disclosure relates to cloud computing, and more specifically to a distributed standards registry (DSR) for facilitating connections between federated cloud-based service providers and service consumers in a federated cloud computing environment.

BACKGROUND

Cloud computing generally refers to a series of processes which allow scalable delivery of various software services utilizing internet technology. Several cloud environments exist today and contain a wide array of beneficial services such as Software as a Service (SaaS) and Infrastructure as a Service (IaaS). These cloud services provide consumers with an elastic service to meet changing needs without physical reconfiguration from the customer themselves.

However, depending on the respective cloud and/or cloud service, various components may be heterogeneous and/or homogenous in nature. Obtaining services within the same cloud environment may be subject to various limitations as the various cloud environments are not designed to interoperate and allow a consumer to choose the cloud service of their choice without limitation. This issue is compounded when seeking services from different cloud environments to form a complete system for a consumer. Accordingly, with the heterogeneity of these various cloud services available through the wide variety of clouds, efficiently connecting, analyzing, and controlling this data becomes a serious challenge.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

SUMMARY

Figure 1:
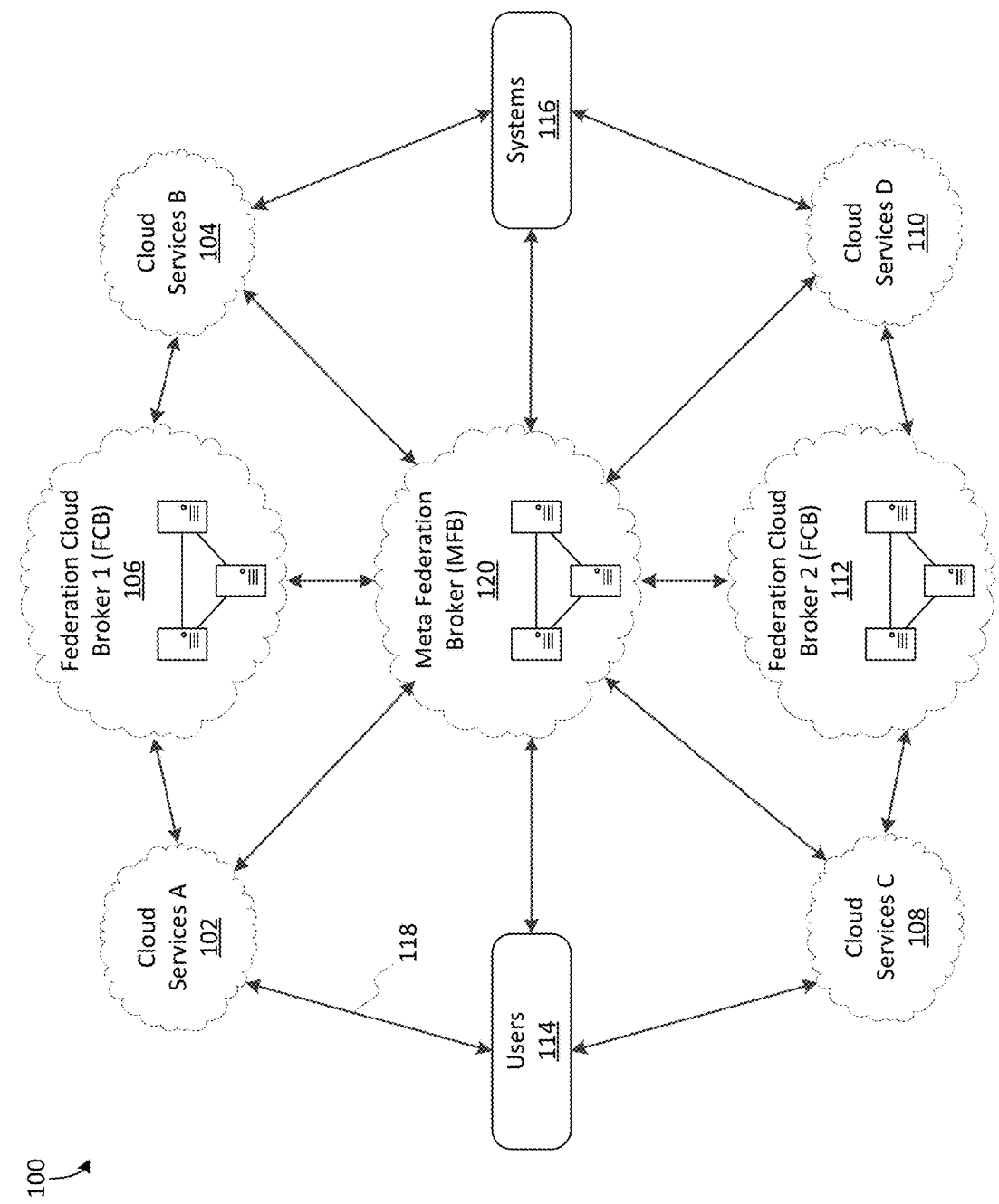
FIG. 1 illustrates an exemplary cloud federation in which a Meta Federation Broker (MFB) may be used in accordance with various embodiments of this disclosure.

One embodiment described herein provides a system for providing a distributed standards registry (DSR) for a federated computing environment. The system includes a plurality of distributed standards registry participants that are collectively configured to provide control logic for the distributed standards registry using a consensus voting mechanism to make control decisions. The system further includes a synchronized copy of a distributed ontology model library maintained on each of the plurality of distributed standards registry participants and storing a plurality of ontology models, each ontology model containing ontological data that describes federation services based on relationships between components of the federated computing environment. The system also includes a distributed federation broker registry distributed across the plurality of distributed standards registry participants and storing registration information for a plurality of federation brokers, each federation broker providing brokerage services related to at least one federation service described by the plurality of ontology models. A first distributed standards registry participant of the plurality of distributed standards registry participants includes a discovery processor operable to receive, from a potential federation participant. a federation participant query that includes semantic query data, the discovery processor further operable to identify at least one ontology model from the plurality of ontology models based on processing the semantic query data included in the federation participant query, and a registry processor operable to receive, from a potential federation broker, a registration request to register the federation broker as providing brokerage services related to a federation service described by one of the plurality of ontology models, the registry processor further operable to store registration information for the federation broker on the federation broker registry.

Another embodiment described herein provides a method of implementing a federated computing environment. The method includes receiving, at a first distributed standards registry participant of a plurality of distributed standards registry participants to a distributed standards registry, from a federation participant, a federation participant query that includes semantic query data. The method also includes querying, by the first distributed standards registry participant, a distributed standards model library based on processing the semantic query data included in the federation participant query. Additionally, the method includes querying, by the first distributed standards registry participant, a federation broker that brokers at least one federation service described by at least one standards model in the distributed standards model library, wherein the distributed federation broker registry that is maintained across the plurality of distributed standards registry participants. The method further includes, upon successfully validating the federation broker, facilitating, by the first meta federation broker, brokerage service related to the at least one federation service from the federation broker to the federation participant.

Another embodiment described herein provides a system for implementing a federated computing environment, the system including one or more computer processors and a memory containing computer program code that, when executed by operation of the one or more computer processors, performs an operation. The operation includes registering a new standards model with a first distributed standards registry participant of a plurality of distributed standards registry participants, wherein the plurality of distributed standards registry participants are configured to operate in conjunction with one another to form a distributed standards registry, and wherein the new standards model is registered in a distributed standards model library of the distributed standards registry maintained across the plurality of distributed standards registry participants. The operation also includes registering, with the first distributed standards registry participant, as a federation broker for the new standards model, wherein the new standards model characterizes federation services according to relationships between components of the federated computing environment, and wherein the first distributed standards registry participant is configured to redundantly store registration information in a distributed federation broker registry that is maintained across the plurality of distributed standards registry participants. Additionally, the operation includes upon receiving a request for a federation service from a federation participant, validating the federation participant. The operation also includes, upon successful validation of the federation participant, facilitating brokering of the requested federation service for the federation participant.

Another embodiment described herein provides a method of implementing a federated computing environment. The method includes requesting, from a first distributed standards registry participant of a plurality of distributed standards registry participants of a distributed standards registry, a standards model that describes federation services using relationships between components of the federated cloud computing environment, wherein the plurality of federation broker participants are configured to store the standards model in a distributed standards model library maintained on each of the plurality of distributed standards registry participants. The method also includes identifying a federation broker that brokers a federation service described in the standards model. Additionally, the method includes negotiating provisioning of the federation service with the federation broker. The method further includes receiving, from the federation broker, brokerage service related to the federation service.

DETAILED DESCRIPTION

The present disclosure generally provides systems and techniques for implementing a distributed standards registry (DSR) for a federated computing environment. The DSR can be formed using a plurality of DSR participants, which can include one or more meta federation brokers. Generally, a meta federation broker enables a plurality of federated cloud service providers to register standards models for cloud services they can provide, and such a meta federation broker can provide one or more Application Program Interfaces (APIs) through which federation participants can submit queries requesting particular cloud services. For example, one such standards model can include an ontology model that describes one or more components defined by the standard and one or more relationships between the components. The meta federation broker can then facilitate the provisioning of the cloud services by one of the cloud service providers for the federation participant, while also validating both the cloud service provide and the federation participant within the federated computing environment.

In one embodiment, the distributed standards registry includes a plurality of distributed standards registry participants that are collectively configured to provide control logic for the distributed standards registry using a consensus voting mechanism to make control decisions. In a particular embodiment, the distributed standards registry participants include one or more meta federation brokers. Additionally, the distributed standards registry may include a synchronized copy of a distributed standards model library maintained on each of the plurality of distributed standards registry participants and storing a plurality of standards models, each standards model describing federation services based on relationships between components of the federated computing environment. The distributed standards registry can also include a distributed federation broker registry distributed across the plurality of distributed standards registry participants and storing registration information for a plurality of federation brokers, each federation broker providing brokerage services related to at least one federation service described by the plurality of standards models.

In one embodiment, the distributed standards registry participants are configured with a discovery processor and a registry processor. In a particular embodiment, the discovery processor is operable to receive, from a potential federation participant. a federation participant query that includes semantic query data, the discovery processor further operable to identify at least one standards model from the plurality of standards models based on processing the semantic query data included in the federation participant query. Additionally, in one embodiment, the registry processor is operable to receive, from a potential federation broker, a registration request to register the federation broker as providing brokerage services related to a federation service described by one of the plurality of standards models, the registry processor further operable to store registration information for the federation broker on the federation broker registry. Generally, by providing a distributed standards registry, embodiments can provide a decentralized solution while still offering all the functionality of a meta federation broker in a scalable and reliable manner.

Referring now to FIG. 1, an exemplary federated computing environment 100, which may be a federated cloud computing environment, is shown having a number of federation members or participants according to one or more embodiments. In this example, the federation participants include cloud service providers 102, 104 that have federated or otherwise made some (or all) of their services and/or resources accessible to one another through a federation cloud broker (FCB) 106. The federation of their services and/or resources affords the cloud service providers 102, 104 greater flexibility and interoperability in terms of the cloud services they may offer through the FCB 106. The cloud service providers 102, 104 in this example may be identity service providers and thus the FCB 106 may be an identity FCB 106. Together the cloud service providers 102, 104 and the identity FCB 106 may form an identity federation. Other federation participants may include cloud service providers 108, 110 that have federated or otherwise made some or all or their services and/or resources accessible to one another through another FCB 112. These cloud service providers 108, 110 and the FCB 112 together may form another type of federation, such as a storage federation. Other types of federations that may be formed include a compute federation, a messaging federation, an e-mail federation, and the like.

In general, the cloud service providers 102, 104, 108, 110 may be any person, organization, or entity that has federated a cloud service through an FCB 106, 112. Examples of cloud service providers include Amazon Web Services® by Amazon®, Google Cloud Platform™, Microsoft® Azure®, and the like. Cloud services that may be provided by various cloud service providers include Software as a Service (SaaS), Data Storage as a Service (DaaS), Infrastructure as a Service (IaaS), Platform as a Service (PaaS), and the like.

Similarly, the federation cloud brokers 106, 112 may be any person, organization, or entity that manages the discovery, use, performance, and delivery of cloud services and resources from the cloud service providers 102, 104, 108, 110 to one or more cloud service consumers 114, 116. In general, an FCB 106, 112 provides brokerage services for the federated cloud services offered by the cloud service providers 102, 104, 108, 110. This means each FCB 106, 112 is responsible for handling any interactions needed between their cloud service providers 102, 104, 108, 110 and the other federation participants to consume services. It should be noted that an FCB is technically separate and distinct from a federation broker (FB) (see FIG. 3), with the FB being any person, organization, or entity that manages the use, performance, and delivery of the cloud services, and negotiates the financial and technical relationships between the cloud service providers and consumers. That said, an FB may operate and perform many of the same functions and services as an FCB, and vice versa, with respect to the various embodiments discussed herein.

The cloud service consumers 114, 116 may be any person, organization, or entity that maintains a business relationship with, and uses service from, the cloud service providers 102, 104, 108, 110. These cloud service consumers 114, 116 may include both individual consumers 114 who access and use the cloud services at least partly on a manual basis as well as system consumers 116 that automatically access and use the cloud services. Other federation participants may include, although not expressly shown in FIG. 1, auditors that conduct independent assessments of cloud services, including information system operations and cloud participant security, and carriers that provide network connectivity and transport of cloud services for the various cloud federation participants.

Network connections 118 provide the network connectivity and transport of cloud services for the federated cloud environment 100. Such network connections 118 may be wireless connections or wired connections, including any physical cabling method such as category 5 cable, coaxial, fiber, copper, twisted pair, and any other physical media to propagate electrical signals. Wireless connections may include, but are not limited to personal area networks (PAN), local area networks (LAN), Wi-Fi, Bluetooth, cellular, global, or space-based communication networks.

In accordance with one or more embodiments, a Meta Federation Broker (MFB) 120 may be provided for the federated cloud environment 100. As mentioned earlier, existing federated cloud environments do not provide any capability for cloud service consumers and other federation participants to search for federation cloud brokers and/or the cloud services brokered thereby. The MFB 120 addresses this technical problem by providing a technical solution in the form of a registry that allows the federation participants to log on at an appropriate URI (e.g., website) and search for one or more federation cloud brokers 106, 112 and the cloud services they broker. Likewise, each FCB 106, 112 may log on to the MFB 120 and register their federation type or model and the cloud services they broker along with information such as cost model, pricing, and other information about the services. Federation participants that are not brokers may also log on and register federation types and cloud services. Indeed, even entities that do not participate in any given federation (i.e., non-federation-participants), such as a standards body or research institution may also log on and register federation types and cloud services. The MFB 120 may require the federation cloud brokers 106, 112 to register their federation types and their cloud services using standards models (e.g., ontology models) and semantic languages. The use of standards models and semantic languages allows the cloud consumers 114, 116 and other federation participants to search the MFB 120 using semantic queries, thereby resulting in search results that are contextually more accurate. In short, the MFB 120 is an entity that stores and manages ontologies which semantically describe specific cloud federation types and capabilities as well as the federation brokers that orchestrate provisioning of federation services under such ontologies.

The term "ontology" is well understood in the art and refers generally to a structured or formal way of representing or describing knowledge or information about a particular subject or concept using semantic language, which captures contextual relationships and associations among various components of the subject or concept. Examples of semantic languages that the MFB 120 may require to be used to define an ontology include Resource Description Framework (RDF), Web Ontology Language (OWL), and OWL-S, among others. The use of semantic language to create ontologies allows the MFB 120 to accept and process semantic queries for the ontologies and thus return more meaningful search results contextually. Such semantic queries, or queries that contain semantic query data, enable retrieval of both explicitly and implicitly derived information based on syntactic, semantic, and structural information contained in the data. As a result, the queries can usually return higher precision search results even in response to relatively fuzzy or wide-open searches by leveraging the use of pattern matching and digital reasoning capabilities.

In some embodiments, the MFB 120 may extend the semantic languages beyond their current capabilities in order to capture additional attributes of a federated computing environment. With OWL-S, for example, the MFB 120 may add attributes to the ontology such as service level agreements (SLA), quality of service (QoS), cost models, pricing information, user reviews and feedback, social-media-style ratings, and the like. This federation extension to OWL-S, which may be referred to as OWL-FED for purposes of this disclosure, includes a top-level extended OWL-S model describing the federation as a whole in terms of extended Service Profile attributes and extended Service Model definitions. A set of such extended OWL-S models may be defined that describe various phases of the federation participation model (e.g., discovery via the MFB, negotiations with the FCB, federated service consumption, provisioning, auditing, etc.) with other federation participants and with the federation cloud brokers.

Figure 2:
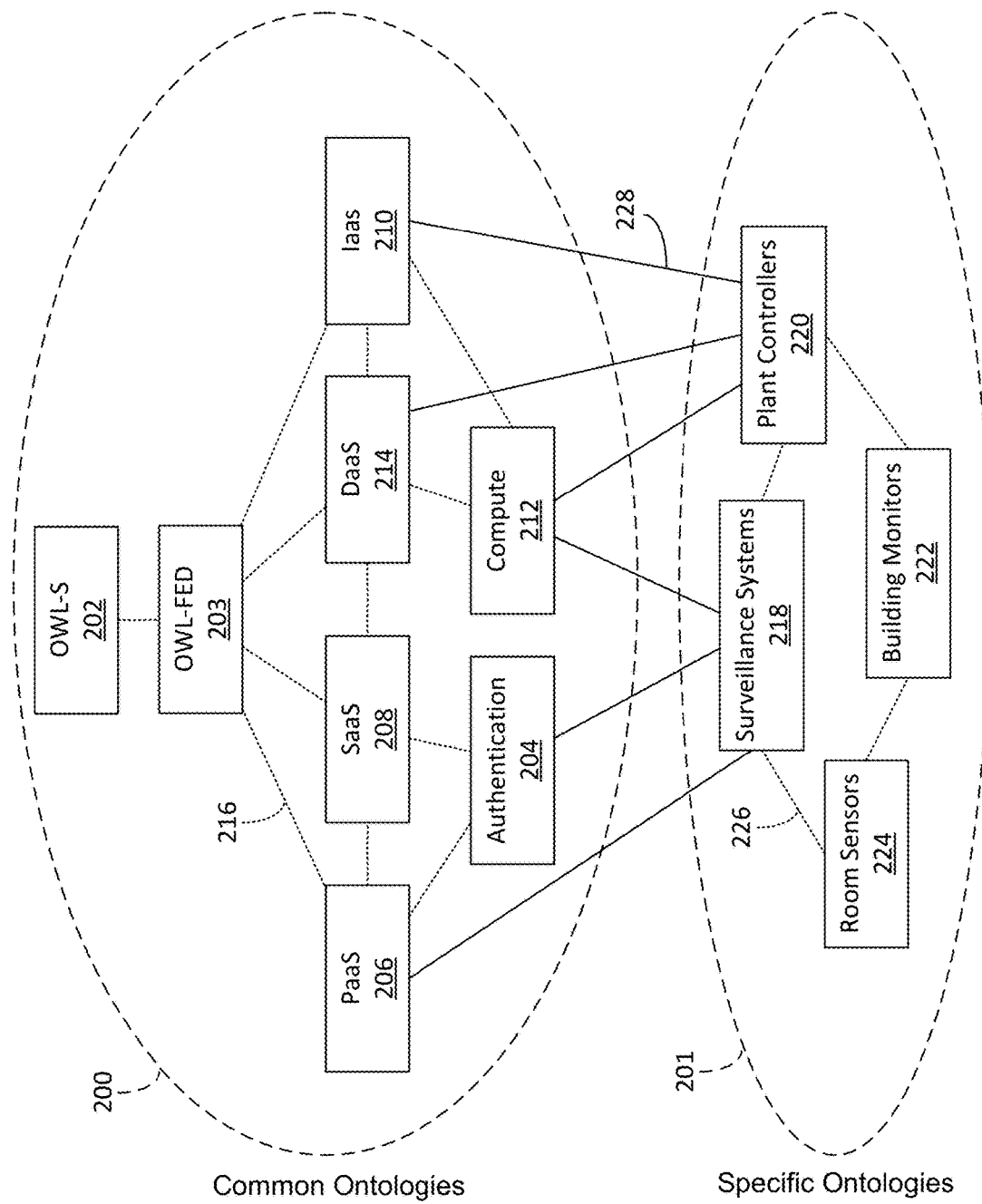
FIG. 2 illustrates exemplary ontologies that may be registered and discovered using an MFB accordance with various embodiments of this disclosure.

FIG. 2 illustrates examples of some of the ontologies that may be managed by the MFB 120, including common ontologies 200 and specific ontologies 201, based on OWL-S (202) and the above extension thereto, OWL-FED (203). Examples of common ontologies 200 include authentication 204, PaaS 206, SaaS 208, IaaS 210, compute 212, DaaS 214, and the like, with potential connections and relationships therebetween indicated by lines 216. Examples of specific ontologies 202 include buildings, surveillance systems 218, plant controllers 220, building monitors 222, room sensors 224, and the like, with potential connections and relationships therebetween indicated by lines 226. Lines 228 indicate potential connections and relationships between one or more of the common ontologies 200 and one or more of the specific ontologies 202.

Figure 3:
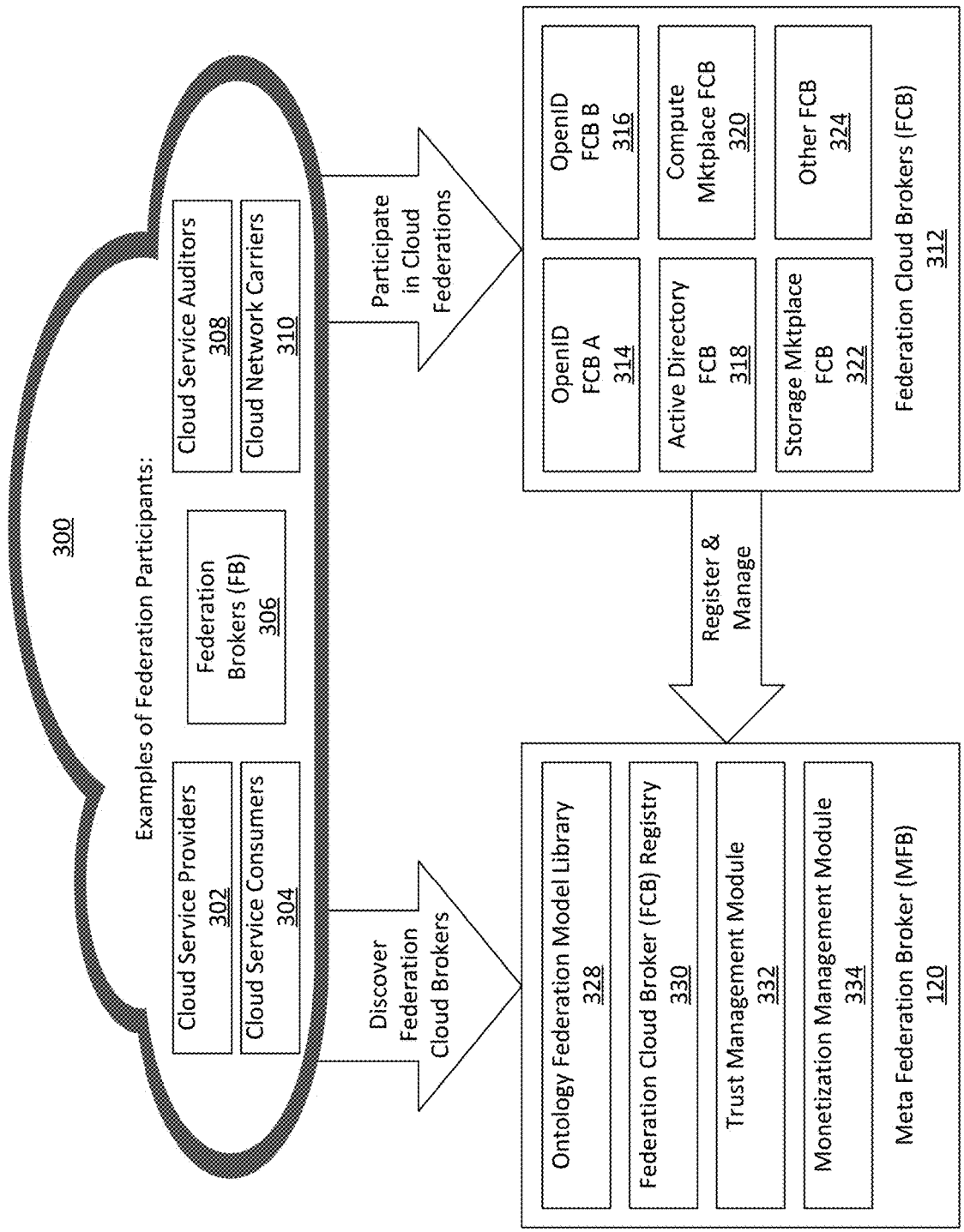
FIG. 3 illustrates an exemplary architecture for an MFB in accordance with various embodiments of this disclosure.

FIG. 3 illustrates an exemplary architecture for an MFB 120 that may be deployed in a federated computing environment 300, which may be a federated cloud computing environment, according to one or more embodiments of this disclosure. As with the federated computing environment 100 (see FIG. 1), the federated cloud environment 300 has several federation participants, including one or more cloud service providers 302, cloud services consumers 304, federation brokers 306, cloud services auditors 308, cloud network carriers 310, and the like. These federation participants 302-310 may be similar in roles and functions to their counterparts in the federated computing environment 100 described above. In particular, the cloud service providers 302 have federated their cloud services via one or more federation cloud brokers, indicated at 312, and each FCB 312 can in turn provide these federated cloud services to the cloud service consumers 304 and other cloud federation participants in a seamless manner.

In the FIG. 3 example, the one or more federation cloud brokers 312 include an OpenID FCB A (314), another openID FCB B (316), an active directory (AD) FCB 318, a compute marketplace FCB 320, a storage marketplace FCB 322, as well as other types of federation cloud brokers 324. Briefly, the openID federation cloud brokers 314, 316 provide openID services, which are basically decentralized authentication services conducted by third-party service providers. Similarly, the active directory FCB 318 brokers active directory services, which are directory services that Microsoft developed for Windows domain networks. The compute marketplace FCB 320 and the storage marketplace FCB 322, as their names suggest, broker compute services and data storage services, respectively.

In accordance with one or more embodiments, each federation cloud broker 312 may log in and register its respective federation type and cloud services at the MFB 120 to allow other federation participants 302-310 to discover the federation cloud brokers 312 and the cloud services they broker. In some embodiments, other federation participants 302-310 may also log in and register federation types and cloud services at the MFB 120. As discussed earlier, the MFB 120 may require the federation types and cloud services to be defined as ontology models using semantic languages in order to enhance searching of the ontology models. To this end, the MFB 120 may include an ontology federation model library 328 that stores the ontology models in a searchable manner (e.g., via one or more databases), and an FCB registry 330 that stores information about the federation cloud brokers 312 in a searchable manner (e.g., via one or more databases).

In general, the ontology federation model library 328 stores ontology models that were created by the federation cloud brokers 312 and uploaded to the MFB 120. Alternatively (or additionally), the ontology models may be created by the federation participants 302-310 and then uploaded and stored at the federation cloud brokers 312 for use in brokering services. In the latter case, the federation cloud brokers 312 may simply upload and store the predefined and prestored ontology models in the ontology federation model library 328. In either case, the ontology models use semantic language to represent and otherwise describe the relationships between various components of the federated cloud computing environment 300. The federation cloud brokers 312 may also make changes and additions to the ontology models and generally manage the ontology models. Additionally, the ontology federation model library 328 may also support user feedback and social-media-style ratings of the ontology models, which may subsequently be used as filters for querying purposes.

The FCB registry 330 provides a registry of federation cloud brokers that allows the federation cloud brokers 312 to publish information about themselves and the cloud services they broker. The federation cloud brokers 312 may likewise make changes and additions to their registrations and generally manage the registrations as needed. And like the ontology federation model library 328, the FCB registry 330 may also support user feedback and social-media-style ratings, which may subsequently be leveraged as filtering criteria for querying purposes.

A trust management module 332 and a monetization management module 334 are also provided in the MFB 120. The trust management module 332 operates to allow the federation cloud brokers 312 and other federation participants to ascertain each other's identities, privileges, and/or trust characteristics. Any suitable authentication technique (e.g., OpenID, AD, etc.) may be used by the trust management module 332, including techniques that involve the re-use of data from the ontology federation model library 328 and the FCB registry 330. The monetization service module 334 facilitates financial transactions between the federation cloud brokers 312 and other federation participants based on their consumption of cloud services, as set out in the ontology federation model library 328 and the FCB registry 330. Any suitable monetization methodologies (e.g., one-time payment, subscription, per-usage, etc.) may be used by the monetization service module 334 to monetize the cloud services, including those that allow the MFB 120 to collect transaction fees and/or other fees.

Figure 4A:
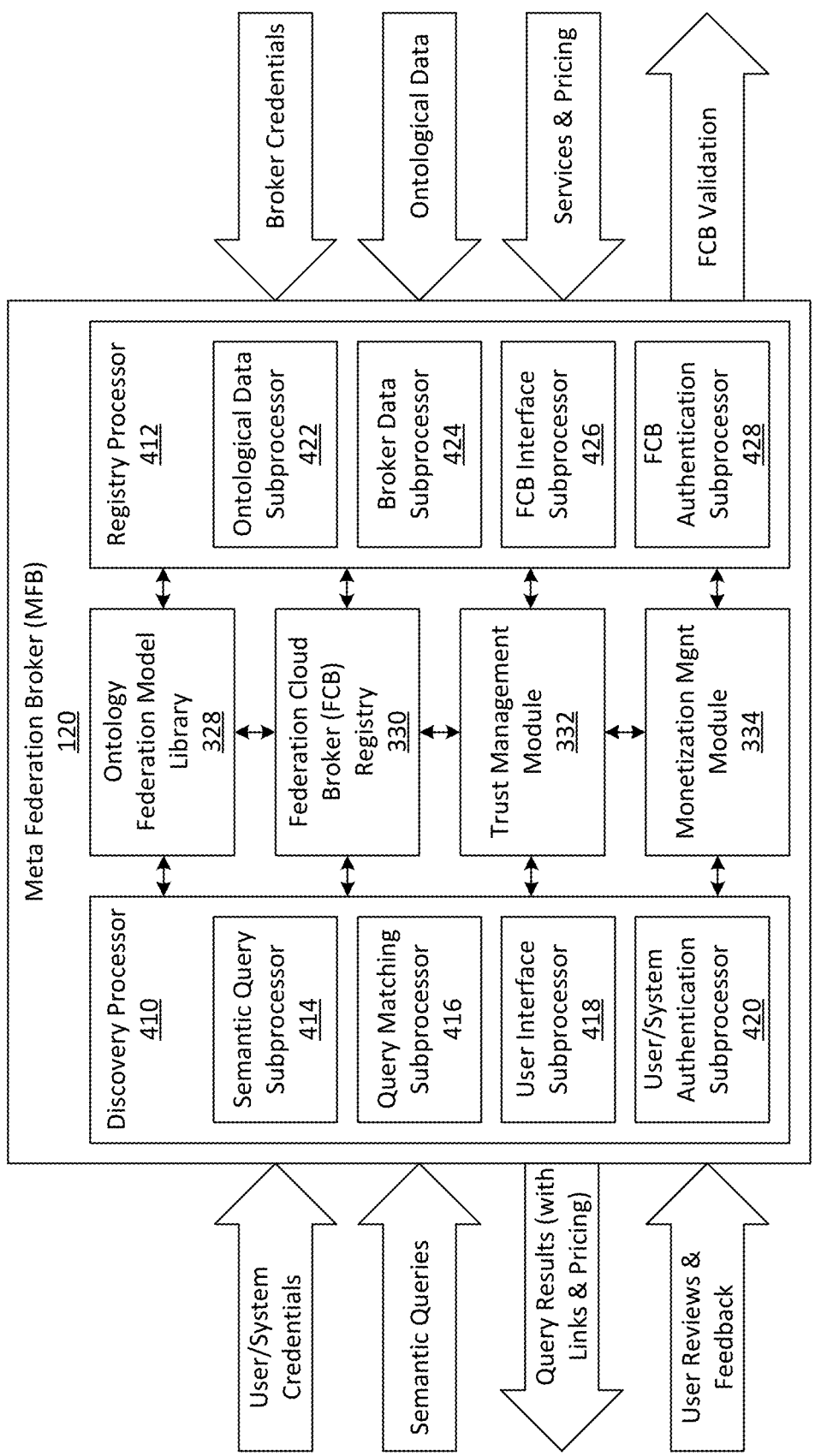
FIGS. 4A-B illustrate exemplary implementations of an MFB in accordance with various embodiments of this disclosure.

FIG. 4 illustrates an exemplary implementation of an MFB 120 in accordance with one or more embodiments. In keeping with the architecture from FIG. 3, the MFB 120 includes an ontology federation model library 328, an FCB registry 330, a trust management module 332, and a monetization management module 334. As discussed, the ontology federation model library 328 stores ontology models that use semantic language to represent or otherwise describe relationships between components of a federated computing environment, while the FCB registry 330 stores registration information for the federation cloud brokers and the cloud services they broker. The storage may be a centralized database in some embodiments, or it may be distributed among several databases in some embodiments.

In some embodiments, the MFB 120 may also include one or more computer processors programmed to implement FCB discovery functionality 410 and FCB registration functionality 412. In general, the Discovery processor 410 operates to allow federation participants to discover the ontology models and the federation cloud brokers, and the Registry processor 412 operates to allow the federation cloud brokers to upload and store their ontology models and respective registration information. These processors 410, 412 may physical processors or they may be virtual processors implemented using software or combination of hardware and software.

In the example of FIG. 4, the Discovery processor 410 has a number of subprocessors, including a semantic query subprocessor 414 and a query matching subprocessor 416. The semantic query subprocessor 120 operates to receive semantic queries from users, including queries that are manually entered by a user as well as queries that are automatically generated by the system. The query matching subprocessor 416 operates to process the semantic queries against the ontology federation model library 328 and/or the FCB registry 330 and determine whether any ontology models and/or federation cloud brokers have cloud services that match the semantic queries. Thereafter, the query matching subprocessor 416 provides the query results, including hyperlinks and/or other identifying information, for any matching federation cloud brokers and their cloud services, which may include pricing information and user ratings in some embodiments, to the users and/or systems that submitted the queries. A user interface subprocessor 418 operates to allow users to engage in various interactions with the MFB 120 (e.g., via a graphical user interface), and a user/system authentication subprocessor 418 operates to authenticate user/system credentials in a known manner prior to permitting interaction with the MFB 120.

The Registry processor 412 likewise has a number of subprocessors, including an ontological data subprocessor 422 and a broker data subprocessor 424. The ontological data subprocessor 422 operates to impose one or more ontological rules on the ontology models uploaded or otherwise stored in the ontology federation model library 328 by the federation cloud brokers to ensure the models comply with ontological requirements. In this way, the ontological data subprocessor 422 can verify that the ontology models have the specific data structures and use the specific semantic language required by the MFB 120, as discussed further below. The broker data subprocessor 424 operates in a similar manner to provide verification with respect to the types of registration information entered in the FCB registry 330 by the federation cloud brokers. An FCB interface subprocessor 426 operates to provide any application interfaces (e.g., API, etc.) required by the federation cloud brokers to interact the MFB 120, and an FCB authentication subprocessor 428 operates to authenticate FCB credentials in a known manner prior to permitting entry of any ontology models or FCB registrations.

An example of an FCB registration that may be registered with an MFB and stored in an FCB registry is shown below in Example 1. In this example, the exemplary FCB registration may include the federation type of the FCB, the cloud service providers that have federated their cloud services through the FCB, and a listing of the cloud services brokered by the FCB. Those skilled in the art will appreciate that the FCB registration may be more complex than the example shown, including more detailed information about the FCB, the federated cloud service providers, and their cloud services, such as cost model and pricing information. The FCB registration may then be discovered when federation participants search the FCB registry and ontology federation model library for federation cloud brokers and/or cloud services using semantic queries that match the FCB registration.

| FCB A | | |
|---|---|---|
| Federation Type | Service Providers | Brokered Services |
| OpenID | Provider X | Authentication 1 |
| | Provider Y | Authentication 2 |
| | Provider Z | Authentication 3 |
| | . . . | . . . |

Example 1: Federation Cloud Broker Registration

Cloud services may be described using a semantic language like RDF, OWL, or OWL-S in the ontology model, as mentioned earlier, extended to cover the necessary federation characteristics. This extension of OWL-S is referred to herein as OWL-FED. The use of ontology models provides a formal or structured way to capture the contextual relationships and associations among various functions and characteristics of the cloud services. An ontology model that uses the OWL-FED language, for example, would describe a cloud service using the following OWL-S components: Service Profile, Service Model, and Service Grounding. In general, the Service Profile describes what the service does, while the Service Model tells how the service is used, including the inputs, outputs, pre-conditions, and results of service execution. The Service Model can also describe a process and interactions between the various federation participants. The process can be based on, for example, atomic transactions or composed transactions (e.g., assembling various atomic transactions). The Service Grounding describes how to use the service through technological means, such as the REST API, or specific protocols or web sockets.

The ontology model may also include a description of the interactions of the federation participants with the cloud federation. In general, the interactions of the federation participants with the cloud federation may be conceptualized as a series of service interactions. This is because the federation participants are interacting with specific network services and performing specific requests and actions when using cloud federation services. These requests and actions include federation discovery (i.e., the federation participant is interacting with the MFB to discover cloud services), federation negotiation (i.e., the federation participant is interacting with the federation cloud brokers to establish pricing and other monetary terms), and federation participation (i.e., the federation participant is interacting other federation participants as providers, customers, auditors, etc.).

In one embodiment, the federation interactions are defined as a series of OWL-S service definitions in the ontology model, collectively representing the extension to OWL-S referred to above as OWL-FED. In such an embodiment, each service definition could correspond to a set of service interactions, the service definitions being united under a single federation-level OWL-FED description that provides an overarching view of the federation. Such a federation-level OWL-FED description may include certain federation-specific information that is currently outside OWL-S, and specified in OWL-FED. The federation-specific information may include a federation-specific Service Model that defines the composition of individual federation services, specified using OWL-S. The information may also include a federation-specific Service Profile that defines federation characteristics, again specified using OWL-S. These characteristics may include, for example, Quality of Service (QoS), cost models, pricing information, user reviews and feedback, social-media-style ratings, and the like. Cloud federation participants may then "look up" the federation cloud brokers for specific federated cloud services that meet their needs and requirements.

An example of an ontology model that may be stored in the ontology federation model library of an MFB is shown below in Example 2. As described above, the ontology model (Ontology Model A) may include ontological data such as a federation-specific Service, a federation-specific Service Model, a federation-specific Service Profile, and a federation-specific Service Grounding, all described using OWL-S. Those skilled in the art will again appreciate that the ontology model may be more complex than the example shown, including more detailed ontological data about the FCB, the federated cloud service providers, and their cloud services, such as cost model and pricing information. The ontology models may then be discovered when federation participants search the ontology federation model library.

| Ontology Model A | | | |
|---|---|---|---|
| Federated Service | Federation Type | OWL-S Comp | Definition |
| Service A | Type X | Service Model | How service works |
| | | Service Profile | What service does |
| | | Service Grounding | How to use service |
| Service B | Type Y | Service Model | How service works |
| | | Service Profile | What service does |
| | | Service Grounding | How to use service |
| Service C | Type Z | Service Model | How service works |
| | | Service Profile | What service does |
| | | Service Grounding | How to use service |
| . . . | . . . | . . . | . . . |

Example 2: Federation Ontology Model

As discussed above, the MFB can reference the ontology models stored in the ontology federation model library using semantic queries. The queries may be manual queries that are performed by a user using a user interface, or the queries may be automatically performed by a system using functionality provided by the MFB. Such a lookup may return an exact match, a degraded match where a match is found for only part of the query request, or a composite match where the MFB identifies a combination of several federation cloud brokers and/or cloud services that together match the query request.

In addition to discovery functionality, the MFB may also provide other functionality that add value and enable and encourage federation cloud brokers and other federation participants to use the MFB instead of dealing directly with each other. Thus, as mentioned above, the MFB may provide a monetization platform for the federation cloud brokers and federation participants to transact with each other, as well as for the MFB to monetize the entire ecosystem at all levels (e.g., participant-to-participant, participant-to-FCB, FCB-to-MFB, and participant-to-MFB). In addition, the MFB may provide federation participants with monetization management functionality integrated with the FCB registry, specialized information about cloud services and service providers, auditors, and the like, as well as the federation cloud brokers, so that participants can find and utilize the services effectively. The transaction management functionality may also support creation of provider ratings, or reputations, as this information provides value to participants.

As one example, a federation participant can use normalized, ontological information about available cloud services to find and select a cloud service. In this example, the MFB can present this information based on a set of relevant service dimensions, all of which can be used as filters. For instance, one dimension of a service search is relevance. Relevance may be used to determine that there is a definitive match between the service profiles the customer needs and the service profiles brokered by the FCB. Secondarily, the customer will generally have service level requirements (a high service level implying higher cost). The customer may request that a search for services include in the resultant list only services brokered by an FCB with a sufficiently high provider rating and/or supporting various service characteristics (cost models, Quality-of-Service guarantees, etc.). Cost can also be used as ranking and other filtering criteria among cloud service provider candidates.

Consider an example of a service customer needing a compute platform service for an overnight batch processing job, which is a common requirement for cloud-based big data integration and analytics operations. In this example, the customer would search for a federated compute platform service. As the batch processing job can be executed anytime during the night, the customer may choose to filter by federation type, then select the federation and FCB supporting service quality characteristics that allows the customer to consume the service at the desired cost/quality level, as the customer is willing to accept a relatively low service level to reduce cost. From the customer's perspective, if the processing job can be guaranteed to complete in the next 8 hours at a lower service level, this is adequate.

On the other hand, while low quality of service may be acceptable, the customer may not accept low ratings for the FCB or the cloud federation in which the FCB participates. The customer may demand the cloud federation or the FCB have a minimum rating of 4 out of 5 stars, for example. Once the customer chooses a cloud federation and FCB, they may apply the same selection criteria to their choice of federation service provider (e.g., compute service provider). By providing this detailed level of information and the capability to efficiently find an appropriate federation and service, a customer is likely to continue use of the MFB.

The monetization management functionality of the MFB also benefits cloud federation participants, which helps ensure that the cloud service consumer, provider, and FCB do not execute transactions outside of the MFB. Additionally, providing value that is not found elsewhere can also encourage federation participants to stay within the MFB. For example, the MFB may represent marketplaces and clearinghouses of non-standard computing products and service offerings. This benefits service providers as they can add an additional sales channel for services that may only be temporarily available or may not be saleable via standard channels. This also benefits consumers as they can find services which may pose excellent value. Federation cloud brokers may also benefit in a manner similar to service providers, but as applied to cloud brokerage services.

To continue the compute platform service example, consider a cloud service provider that has extra compute resources available to sell, but which cannot be sold efficiently via normal subscription lifecycle sales process. The MFB may enable such a provider to easily introduce and broker through the federation cloud brokers the service at a lower cost and/or a lower service level agreement (SLA) compute platform services when available, then disable the service when no longer available. By providing a way for cloud service customers to use limited-time or special case service offerings, a provider can make maximum use of available platform resources, thereby generating revenue from resources that may have remained unused without the MFB.

Thus, by offering an easy way for federation cloud brokers to sell a variety of brokerage services, providers to sell a wider variety of cloud services, and the resulting additional choices to customers, the MFB provides value that the federation cloud brokers, providers, and customers will not find outside of the MFB. Value may also be found in the elimination of transactional friction, thereby further reducing the likelihood that federation cloud brokers, providers, and customers may directly execute transactions outside of the MFB.

And as touched upon earlier, the MFB can generate revenue using different monetization models, each providing purpose to specific scenarios. One possibility is to sell MFB services as a subscription to customer and/or providers. Another possibility is to charge a percentage of each transaction conducted through the MFB, either as a flat fee for securing the transaction or a percentage fee on the total cost of the use of the MFB. These fees may be borne by the consumer or the provider, or both. Both scenarios assume that the transaction is monitored by the MFB. Analytics can be used to generate revenue via profiling, data can be provided to service providers to guide them as to which types of service definitions are most in demand. Data can be provided to customers about types of available services which match their usage patterns, and the like.

In a particular embodiment, the MFB 120 can be implemented using a distributed model, where a plurality of MFB participants work together to implement the control logic and functionality of the MFB 120. Doing so provides a decentralized implementation of the MFB 120, thereby preventing any single entity from controlling a centralized registry infrastructure. In a particular embodiment, the plurality of MFB participants operation in s distributed peer-to-peer (P2P) manner (as opposed to a centralized system or cluster controlled by a single organization or entity) to manage a Distributed Standards Registry (DSR). Such a DSR may provide superior scalability and resilience relative to a centralized standards registry, and the DSR may be managed by the plurality of MFB participants using a decentralized control mechanism. For example, the plurality of MFB participants can be configured to implement a P2P clustering and distribution mechanism, such as a Blockchain implementation or a Distributed Hash Table (DHT) algorithm. In one embodiment, the P2P clustering and distribution mechanism implemented by the plurality of MFB participants can be Byzantine fault tolerant (BFT), thereby improving the resilience of the distributed system against attacks and malfunctions.

Figure 4B:
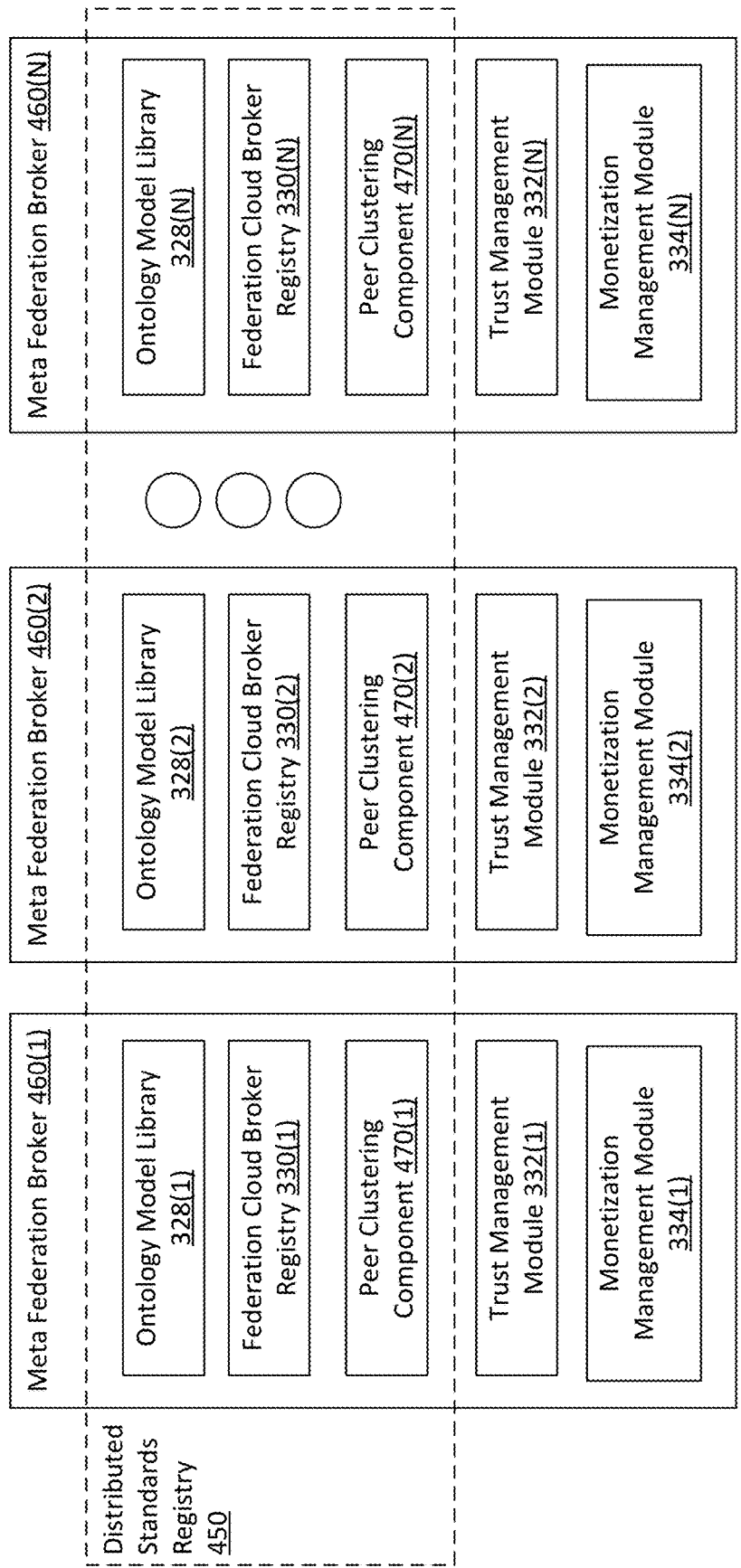

FIG. 4B illustrates a system 440 which includes such a distributed standards registry 450, according to one embodiment described herein. As shown, the system 440 includes a plurality of meta federation brokers 460(1)-(N). Each of the MFBs 460(1)-(N) contains a respective ontology model library 328, federation cloud broker registry 330), peer clustering component 470(1)-(N), trust management module 332(1)-(N) and monetization management module 334(1)-(N). Although each MFB 460(1)-(N) contains an ontology model library 328 in the depicted example, more generally the MFBs 460(1)-(N) can contain a standards model library using any suitable format for describing a standard, and the use of ontologies is provided for illustrative purposes only and without limitation.

In the depicted illustration, a DSR registry 450 is formed by the ontology model libraries 328(1)-(N), federation cloud broker registries 330(1)-(N) and peer clustering components 470(1)-(N) of the MFBs 460(1)-(N). Generally, the peer clustering components 470(1)-(N) are configured to implement a P2P clustering and distribution mechanism (e.g., an implementation of a DHT). For example, the plurality of MFB participants 460(1)-(N) could provide an API(s) through which participants can query a distributed standards model using model data (as well as other data, such as ratings data, pricing data, and so on). Additionally, such API(s) could further enable participants to query for various providers using, e.g., implementer metadata and other information (e.g., ratings data). A trust infrastructure can also be provided by the plurality of MFB participants 460(1)-(N), for use in validating various parties involved in transactions with the distributed standards registry 450. For example, the plurality of MFB participants 460(1)-(N) could use the trust infrastructure to validate a particular cloud service provider, before returning an indication of the particular cloud service provider as part of a query submitted to the API(s).

In one embodiment, the distributed standards registry 450 is configured to store a distributed ontology model library (also referred to herein as a distributed standards library). In a particular embodiment, an identical copy of the distributed standards library is stored on each of the plurality of MFBs 460(1)-(N) within the DSR 450. In such an embodiment, the plurality of MFB participants 460(1)-(N) can be configured to keep such copies synchronized with one another in real-time. In another embodiment, the portions of the standards library could be distributed across the plurality of MFBs 460(1)-(N) within the DSR 450.

Additionally, the distributed MFB 450 can also maintain a distributed federation broker registry across the plurality of DSR participants 460(1)-(N). In a particular embodiment, identical copies of the distributed federation broker registry are stored on each of the MFBs 460(1)-(N) and these copies are kept in sync with one another as modification operation are performed on the registry. In one embodiment, the distributed federation broker registry is redundantly distributed across the plurality of MFB participants 460(1)-(N).

Doing so enables each of the MFB participants 460(1)-(N) to store only a portion of the distributed federation broker registry, but allows the distributed federation broker registry to be stored in a manner that is fault tolerant, thereby increasing the resilience of the system in the event of an attack or a failure of one of the MFBs 460(1)-(N). Additionally, the DSR 450 can maintain a feedback and ratings database(s) for storing user-submitted ratings information on ontology models, service providers and the like. Such a feedback and ratings database(s) could be redundantly distributed across the plurality of MFBs 460(1)-(N).

Generally, the DSR 450 can be configured to support all the capabilities of the MFB 120, including management of the standards registry. Such management can include, for example, standards registration, provider registration, standards querying, provider querying, standards and provider metadata, etc. Additionally, these various functions can be carried out by one or more of the plurality of MFBs 460(1)-(N), using a distributed standards registry that is implemented using a peer-to-peer clustering mechanism. As a result, the decentralized DSR 450 can provide the functionality of the MFB 120 using decentralized, consensus-driven decision-making. Moreover, the distributed standards registry can be Byzantine fault tolerant, and the plurality of MFBs 460(1)-(N) can be configured to dynamically add and remove particular MFB participants using Byzantine fault-tolerant decision-making. Likewise, the plurality of MFBs 460(1)-(N) can be configured to dynamically add and remove registered standards and standards providers using BFT decision-making.

Figure 5:
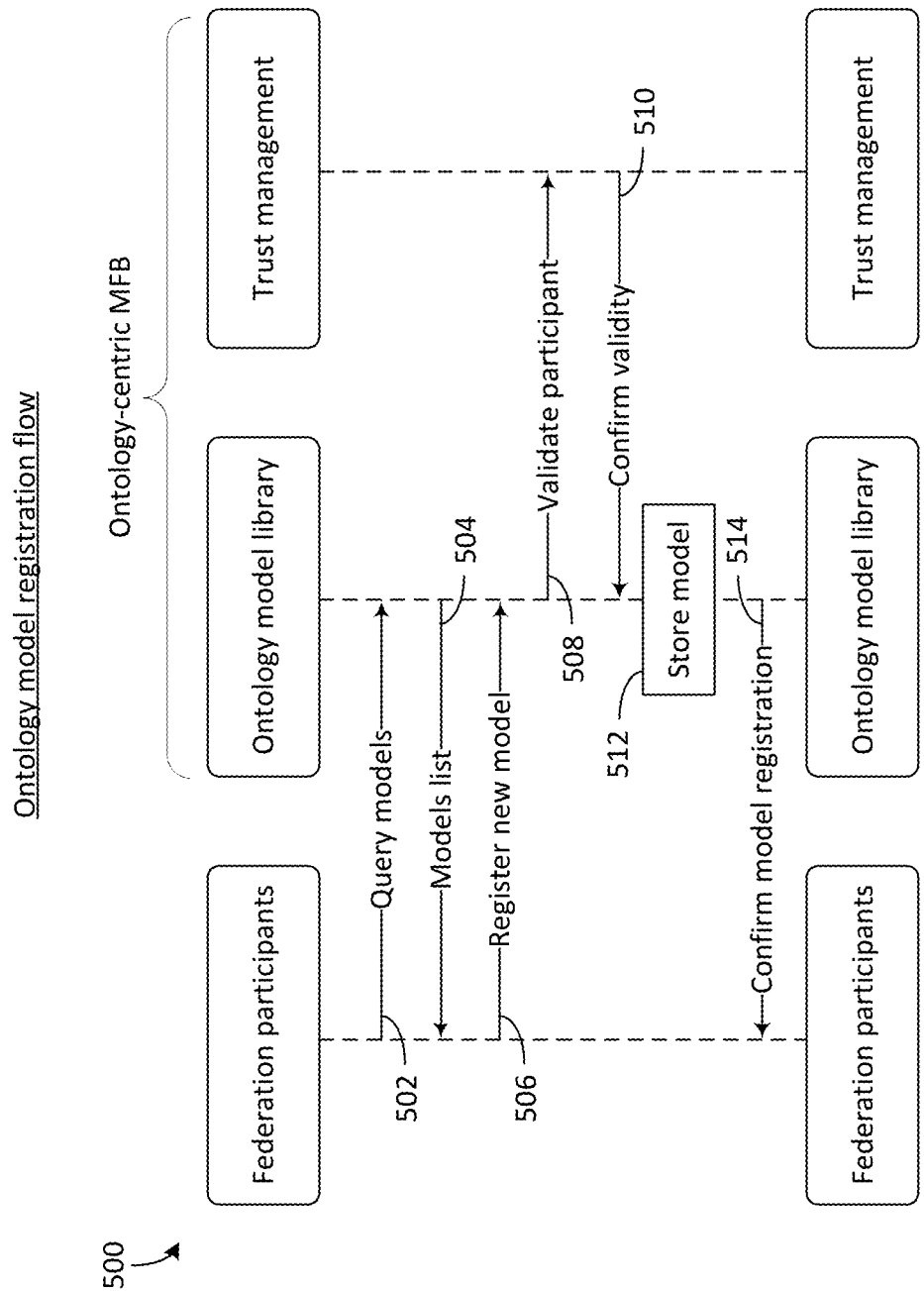
FIG. 5 illustrates an exemplary ontology model registration workflow for an MFB in accordance with various embodiments of this disclosure.

Referring to FIG. 5, an exemplary workflow 500 for registering an ontology model with an MFB according to one or more embodiments is shown. The workflow 500 generally begins at arrow 502 with a federation participant submitting a semantic query to an ontology model library of an MFB to discover ontology models matching certain criteria of interest. For this ontology model registration workflow 500, the federation participant is typically a federation cloud broker, but may also be any federation participants that is seeking to register an ontology model with the MFB. At arrow 504, the MFB processes the query against the ontology model library and returns a list of models, if any, that match or partially match the criteria of interest to the federation participant. Examples may include various identification service models, storage service models, compute service models, and the like.

If the returned list of models does not include any ontology models that match the criteria of interest, the federation participant may submit a new (i.e., not previously registered) ontology model to the ontology model library at arrow 506. Examples of new ontology models may include message services models, e-mail service models, Internet of Things (IoT) service models, and the like. Upon receiving the new ontology model registration request, the MFB validates the federation participant via a trust management module at arrow 508. The trust management module checks whether the federation participant is a legitimate federation participant and, if yes, the trust management module confirms validation of the federation participant at arrow 510. Thereafter, the MFB stores the new ontology model in the ontology model library, indicated at 512, and confirms registration of the new ontology model to the federation participant at arrow 514.

While an established cluster of MFB participants 460(1)-(N) can reliably add or remove particular MFB participants using P2P clustering techniques, the initial establishment of the cluster of MFB participants 460(1)-(N) can be a significant challenge (with the goal of eliminating any single points of failure). In one embodiment, to enable secure cluster creation, the initial cluster of MFB participants 460(1)-(N) could be formed using an out-of-band consensus (e.g., an in-person conference of trusted parties). In one embodiment, this initial cluster includes founder nodes in trusted administrative domains to further ensure the security and reliability of the distributed MFB 450. Such trusted founder nodes may be used to distribute the participant registry and other information for new nodes willing to join the cluster.

Generally, the minimum number of MFB participants 460(1)-(N) needed to initially form a cluster may vary with the choice of BFT algorithm. For example, some algorithms may require at least 3 MFB participants to form the initial cluster, while other algorithms may require 4 or more MFB participants. However, such example are provided for illustrative purposes only and without limitation, and more generally any suitable number of MFP participants can be used to form the initial cluster, consistent with the functionality described herein.

With regard to adding new MFB participants to the cluster of MFB participants 460(1)-(N) forming the distributed MFB 450, a new node attempting to join the cluster may query a known MFB participant 460(1)-(N) (which may be a founder node) to request the cluster member registry. The potential new node could then submit a join request to the known MFB participant, and the known MFB participant could then propagate the submitted request to the other MFB participants 460(1)-(N) in the cluster via replication behavior (i.e., according to the P2P clustering algorithm implemented by the MFB participants 460(1)-(N) of the distributed MFB 450). The existing plurality of MFB participants 460(1)-(N) could then vote on the application of the potential new node, and a decision can be made based on a consensus of the votes. For example, the potential new node could be accepted if a majority of votes are received in favor of admittance of the potential new node. In a particular embodiment, the plurality of MFB participants 460(1)-(N) are configured to use a Byzantine-fault-tolerant voting process to further increase the security and reliability of the distributed MFB 450.

In one embodiment, to avoid flooding by spurious join requests, the plurality of MFB participants 460(1)-(N) may rate-limit join requests from potential new nodes, and may blacklist abusive clients that attempt to exceed such limits (or who otherwise exhibit abusive, malicious or potentially erroneous behavior). Upon successfully joining, a new MFB participant may perform a catch-up operation on the DSR participant registry and the standards library, so that the new MFB participant can begin fulfilling its role as a MFB participant.

Figure 6:
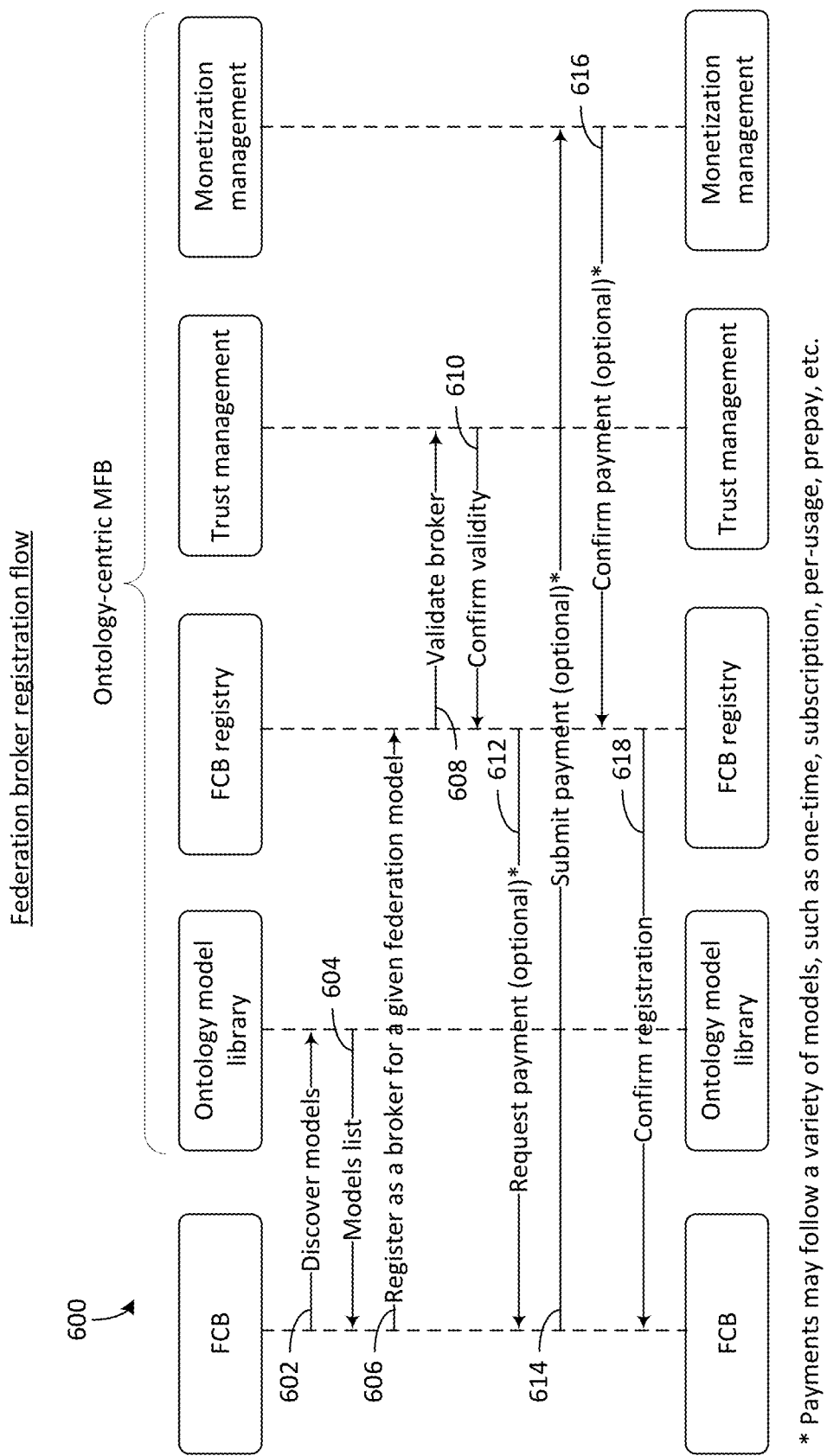
FIG. 6 illustrates an exemplary FCB registration workflow for a MFB in accordance with various embodiments of this disclosure.

FIG. 6 illustrates an exemplary FCB registration workflow 600 for an MFB in accordance with various embodiments of this disclosure. The workflow 600 generally begins at arrow 602 with an FCB submitting a semantic query to an ontology model library of an MFB to discover ontology models matching certain criteria of interest. At arrow 604, MFB processes the query against the ontology model library and returns a list of models, if any, that match or partially match the criteria of interest to the FCB.

Upon receiving the list of ontology models that match the criteria of interest, the FCB may register itself with an FCB registry of the MFB at arrow 606 as a broker for a given federation model or federation type described in one of the ontology models. Upon receiving this FCB registration request, the MFB validates the FCB using a trust management module at arrow 608. The trust management module checks whether the FCB is a legitimate FCB and, if yes, the trust management module confirms the validity of the FCB at arrow 610.

At this point, the MFB may optionally request payment from the FCB at arrow 612 in exchange for allowing the FCB to register itself on the FCB registry. If the payment terms are acceptable, the FCB submits payment at arrow 614 to the MFB via a monetization management module of the MFB. The monetization management module processes and confirms receipt of the payment to the MFB at arrow 616, after which the MFB registers the FCB in the FCB registry. The MFB thereafter confirms the registration of the FCB at arrow 618.

Figure 7:
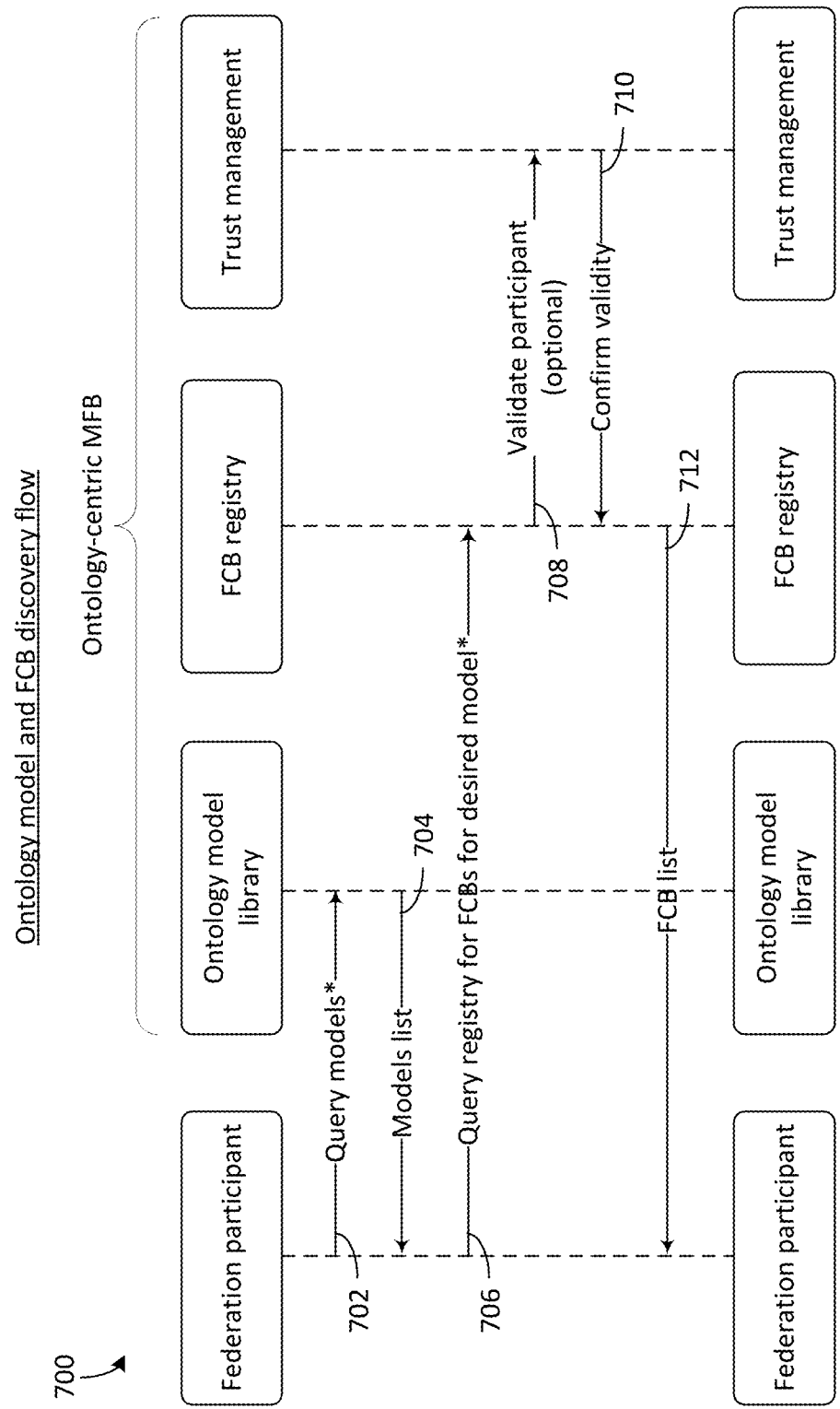
FIG. 7 illustrates an exemplary ontology model and FCB discovery workflow for an MFB in accordance with various embodiments of this disclosure.

FIG. 7 illustrates an exemplary ontology model and FCB discovery workflow 700 for an MFB in accordance with various embodiments of this disclosure. The workflow 700 generally begins at arrow 702 with a federation participant submitting a semantic query to an ontology model library of an MFB to discover ontology models matching certain criteria of interest. The federation participant is likely to be a federation cloud broker for this discovery workflow 700, but may also be any federation participant that is seeking to discover an ontology model and an FCB from the MFB. The MFB processes the query against the ontology model library and returns a list of models, if any, that match or partially match the criteria of interest to the federation participant at arrow 704.

The federation participant then submits a semantic query to an FCB registry of the MFB at arrow 706 to discover federation cloud brokers that broker cloud services corresponding the services described by one or more of the ontology models in the returned list of ontology models. Upon receiving the query for the FCB registry, the MFB validates the federation participant via a trust management module at arrow 708. The trust management module checks whether the federation participant is a legitimate federation participant and, if yes, the trust management module confirms the validity of the federation participant at arrow 710. Thereafter, the MFB processes the query against the FCB registry and returns a list of federation cloud brokers, if any, corresponding to the returned list of ontology models to the federation participant at arrow 712.

Figure 8:
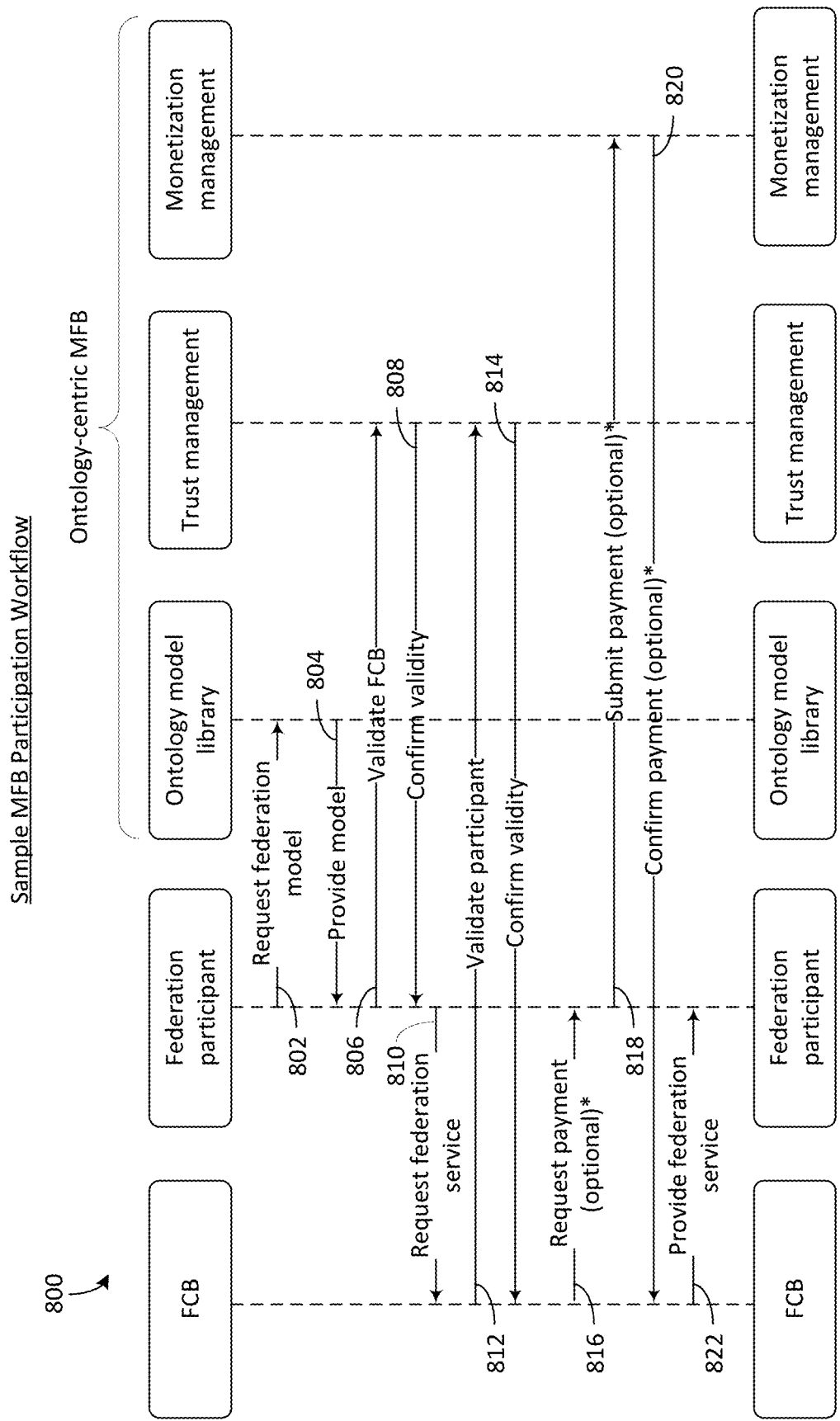
FIG. 8 illustrates an exemplary MFB participation workflow in accordance with various embodiments of this disclosure.

FIG. 8 illustrates an exemplary MFB participation workflow 800 in accordance with various embodiments of this disclosure. The workflow 800 generally begins at arrow 802 with a federation participant submitting a semantic query to an ontology model library of an MFB to determine whether a particular federation model or federation type is currently described by the ontology models in the ontology model library. The MFB processes the query against the ontology model library and returns a list of ontology models, if any, that match or partially match the requested federation model to the federation participant at arrow 804.

The federation participant next selects an FCB that brokers cloud services corresponding to a desired one of the ontology models from the returned list and requests validation of the selected FCB from the MFB at arrow 806. Upon receiving the validation request, the MFB checks via a trust management module whether the selected FCB is a legitimate FCB and, if yes, the MFB confirms the validity of the selected FCB to the federation participant at arrow 808. The federation participant may then request provisioning of federation service from the selected FCB at arrow 810.

Upon receiving the request for provisioning of federation service, the FCB requests validation of the federation participant from the MFB at arrow 812. The MFB then checks via a trust management module whether the federation participant is a legitimate participant and, if yes, the MFB confirms the validity of the federation participant to the FCB at arrow 814.

At arrow 818, the FCB may optionally request payment from the federation participant in exchange for provisioning of the federation service. If the payment terms are acceptable, the federation participant submits payment to the FCB via a monetization management module of the MFB at arrow 818. The monetization management module 810 processes and verifies receipt of the payment, and the MFB confirms the payment to the FCB at arrow 820. The FCB thereafter provisions or arranges for provisioning of the requested federation service to the federation participant at arrow 822.

Figure 9:
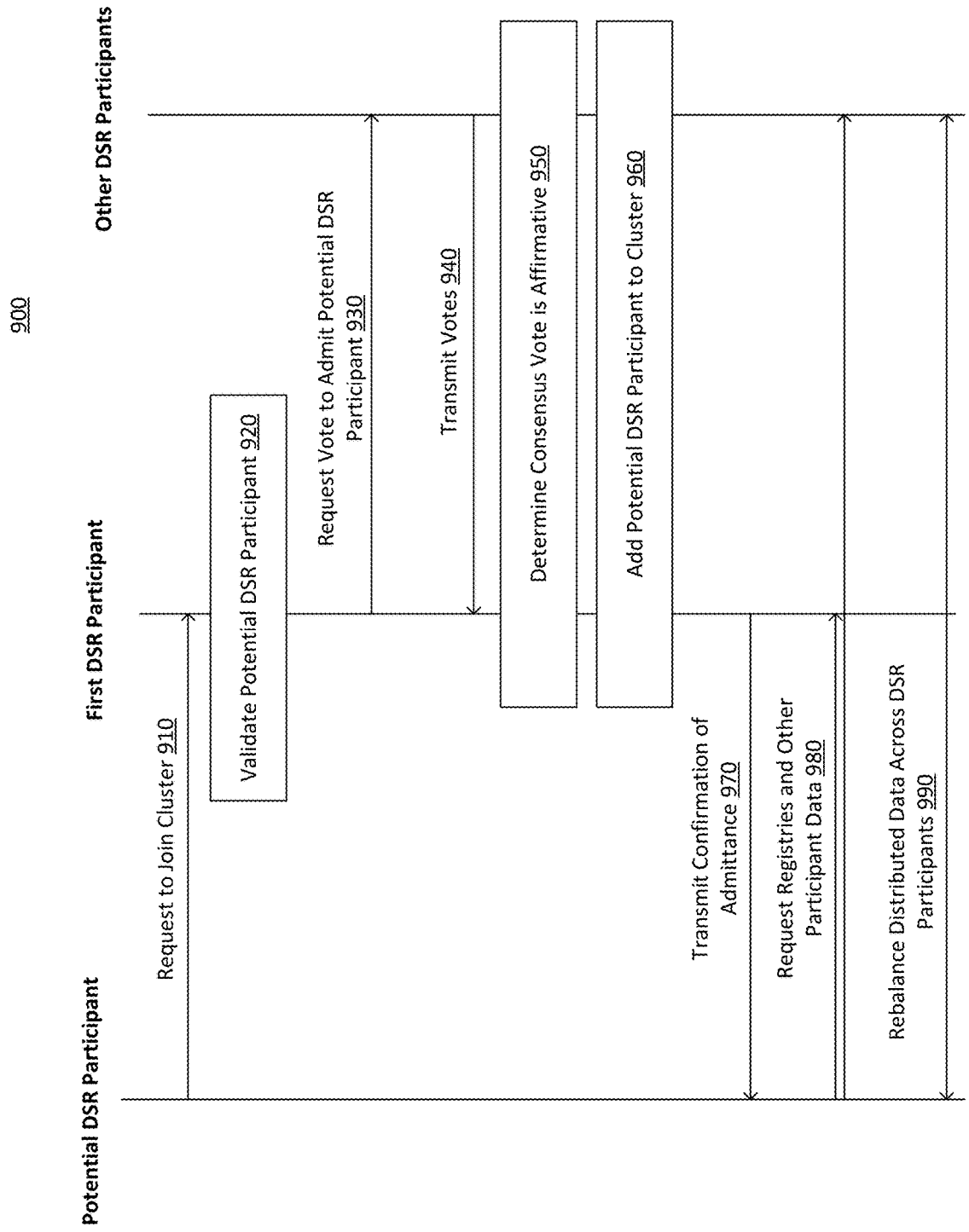
FIG. 9 is a workflow for adding a potential DSR participant to a DSR cluster, according to one embodiment described herein.

FIG. 9 is a workflow for adding a potential DSR participant to a DSR cluster, according to one embodiment described herein. As shown, the method 900 begins at operation 910, where a first DSR participant transmits a request to a first DSR cluster participant to join the DSR cluster. The first DSR participant validates the potential DSR participant (operation 920). For example, the first DSR participant could receive a security certificate (e.g., a Secure Sockets Layer (SSL) certificate) that identifies the potential DSR participant, and the first DSR participant could validate the potential DSR participant by ensuring that the security certificate was granted by a trusted authority and that the security certificate is still valid.

Upon validating the identity of the potential DSR participant, the first DSR participant requests a vote from all the DSR participants in the DSR cluster as to whether to admit the potential DSR participant (operation 930). The DSR participants in the cluster determine and transmit their respective votes to one another (operation 940). In the depicted embodiment, the DSR participants in the DSR cluster determine that the consensus vote is affirmative, based on their own vote and the received votes from the other DSR participants (operation 950). Upon determining the consensus vote is an affirmative vote to add the potential DSR participant to the cluster, the DSR participants add the potential DSR participant to the DSR cluster (operation 960). In the depicted embodiment, the first DSR participant transmits a confirmation of the admittance to the potential DSR participant (operation 970).

Upon receiving the confirmation, the potential DSR participant requests various registries and other participant data from the various DSR participants in the DSR cluster (operation 980). For example, the potential DSR participant could request copies of a standards registry, a service provider registry, and so on. Additionally, in the depicted embodiment, the DSR cluster participants (including the newly added potential DSR participant) perform and operation to rebalance any distributed cluster data across the DSR participants in the cluster (operation 990). For example, in one embodiment, the service provider registry can be distributed across the various DSR participants in a manner that ensures Byzantine fault tolerance (e.g., using a form of DHT). Upon adding the new DSR participant to the cluster, at least a portion of the data in the service provider registry could be redistributed across the DSR participants to account for the newly added DSR participant.

Figure 10:
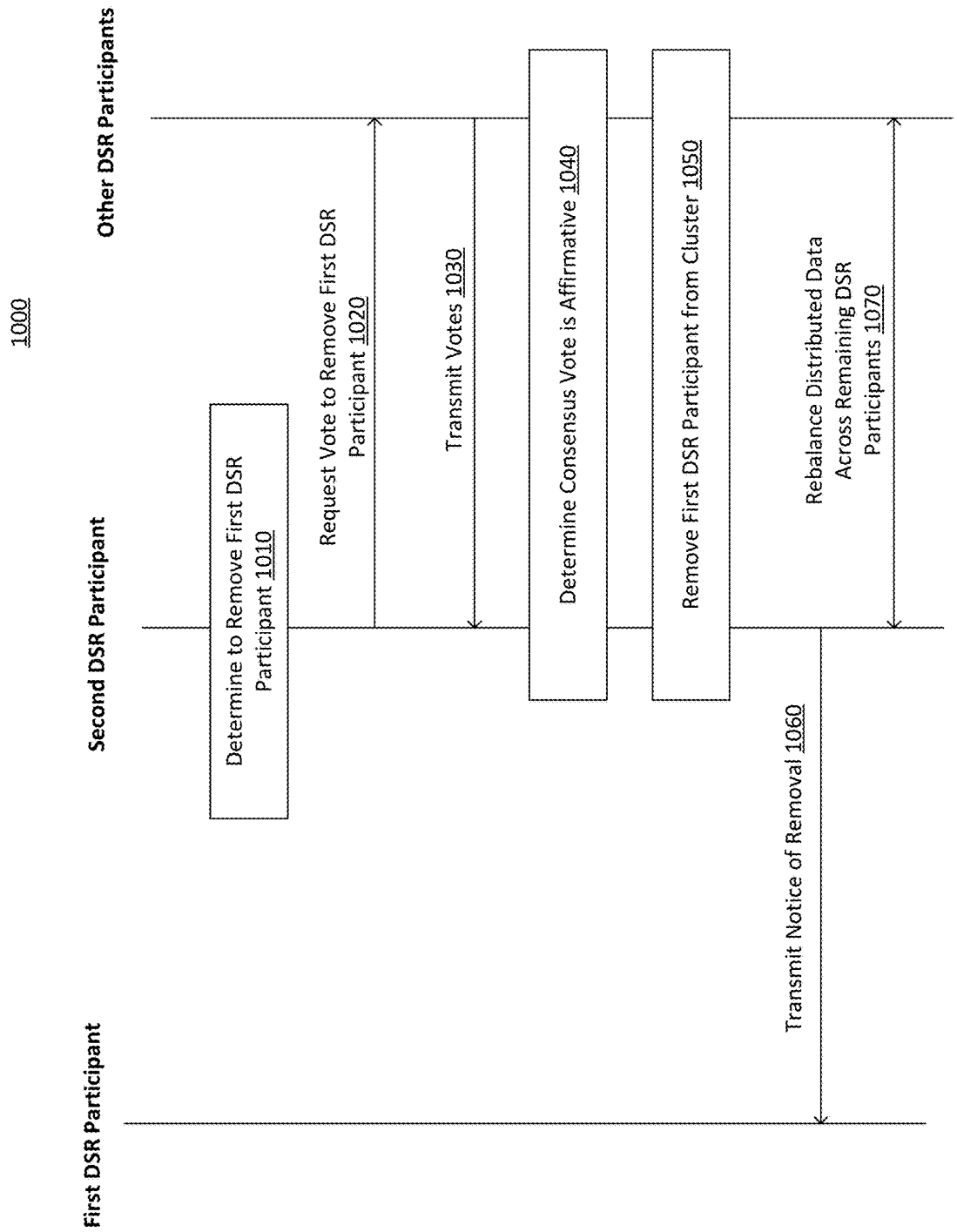
FIG. 10 is a workflow for removing a DSR participant from a DSR cluster, according to one embodiment described herein.

FIG. 10 is a workflow for removing a DSR participant from a DSR cluster, according to one embodiment described herein. As shown, the workflow 1000 begins at operation 1010, where a second DSR participant in a DSR cluster determines to remove a first DSR participant from the DSR cluster. Generally, a number of scenarios can lead to a DSR participant deciding to attempt to remove another DSR participant from the DSR cluster. For example, such scenarios can include (without limitation) the other DSR participant exhibiting erroneous behavior, the other DSR participant exhibiting slow response times or becoming unresponsive altogether, and so on.

Upon determining to remove the first DSR participant, the second DSR participant requests a vote on the removal of the first DSR participant from the other members of the DSR cluster (operation 1020). In response, the DSR participants in the DSR cluster determine and transmit their votes on the removal of the first DSR participant to one another (operation 1030). The DSR participants in the DSR cluster determine whether the consensus vote was in the affirmative to remove the first DSR participant (operation 1040). In the depicted embodiment, the DSR participants determine that the consensus vote was affirmative and remove the first DSR participant from the DSR cluster (operation 1050). The second DSR participant transmits a notice to the first DSR participant, indicating that the first DSR participant was removed from the DSR cluster (block 1060). Additionally, in the depicted embodiment, any distributed data is rebalanced across the remaining DSR participants (operation 1070).

Figure 11:
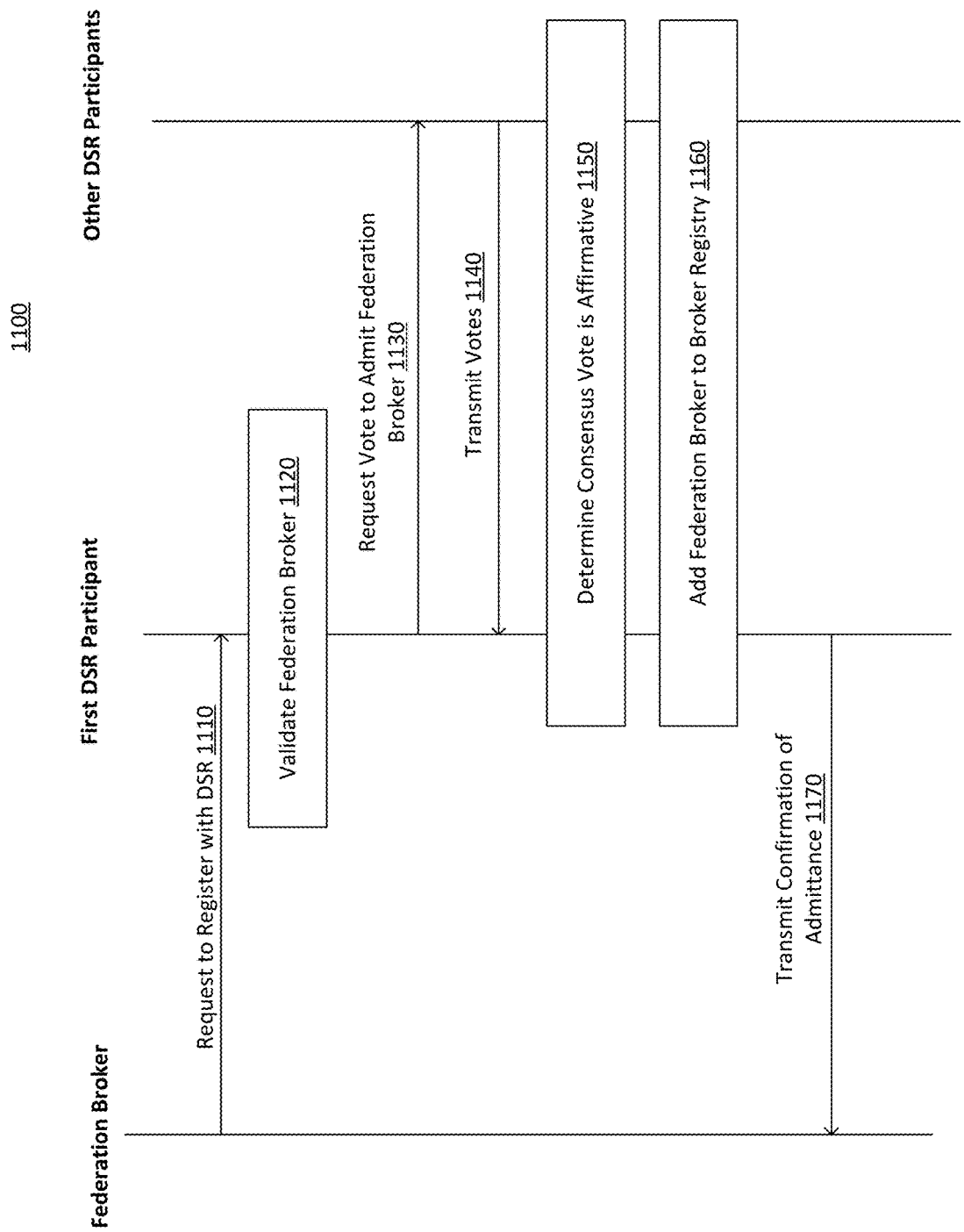
FIG. 11 is a workflow for adding a federation broker to a broker registry of a DSR cluster, according to one embodiment described herein.

FIG. 11 is a workflow for adding a federation broker to a broker registry of a DSR cluster, according to one embodiment described herein. As shown, the workflow 1100 begins at operation 1110, where a federation broker transmits a request to a first DSR participant to register with a distributed standards registry. The first DSR participant validates the federation broker (operation 1120). For example, the first DSR participant could verify that a security certificate provided by the federation broker was provided by a trusted authority and that the security certificate is still valid and has not expired.

Upon validating the federation broker, the first DSR participant requests a vote from the other DSR participants in the DSR cluster on whether to admit the federation broker (operation 1130). The DSR participants determine their respective votes and transmit their votes to one another (operation 1140), and in the depicted example, the DSR participants determine that the consensus vote is affirmative (operation 1150). As a result, the DSR participants add the federation broker to the broker registry (operation 1160). Additionally, in the current example, the first DSR participant transmits a confirmation to the federation broker, indicating that the federation broker was admitted to the DSR (operation 1170).

Figure 12:
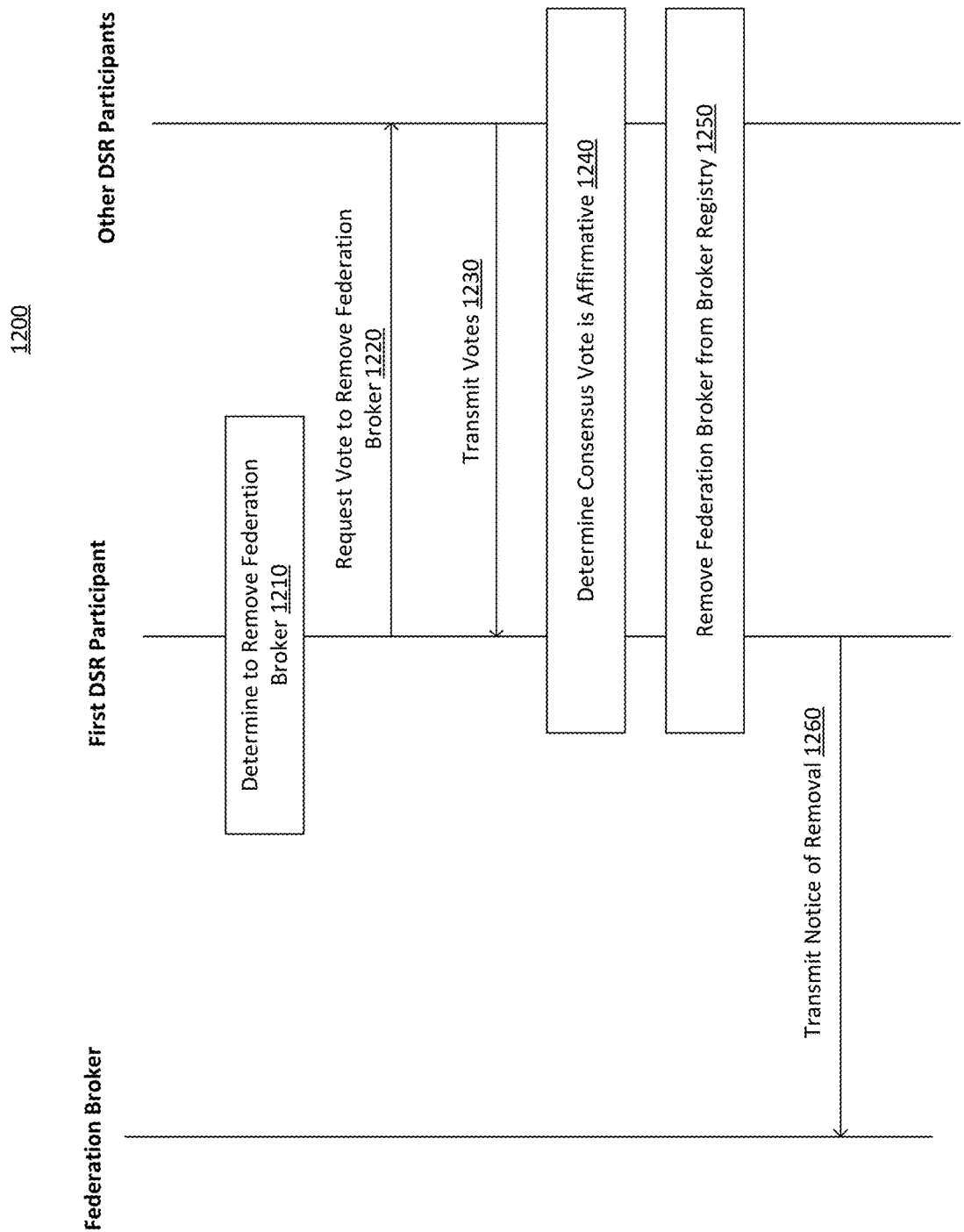
FIG. 12 is a workflow for removing a federation broker from a broker registry of a DSR cluster, according to one embodiment described herein.

FIG. 12 is a workflow for removing a federation broker from a broker registry of a DSR cluster, according to one embodiment described herein. As shown, the workflow 1200 begins at operation 1210, where a first DSR participant determines to remove a federation broker from the DSR. Generally, the first DSR participant could determine to remove a federation broker for a variety of different reasons, including, for example and without limitation, erroneous behavior by the federation broker, slow responsive times or unresponsiveness by the federation broker, user ratings indicating poor performance by the federation broker, and so on. More generally, it is contemplated that a DSR participant could determine to attempt to remove a federation broker from the broker registry for any suitable reason, consistent with the functionality described herein.

The first DSR participant initiates a vote on whether to remove the federation broker from the other DSR participants (operation 1220). The DSR participants in the cluster determine their respective votes and transmit these votes to one another (operation 1230). The DSR participants then determine whether the consensus of the vote was to remove the federation broker. In the depicted embodiment, the DSR participants determine that the consensus on removing the first federation broker was affirmative (operation 1240) and the DSR participants remove the federation broker from the broker registry of the DSR (operation 1250). Additionally, in the depicted embodiment, the first DSR participant transmits a notice to the first federation broker, indicating that the first federation broker was removed from the broker registry of the DSR (operation 1260).

Figure 13:
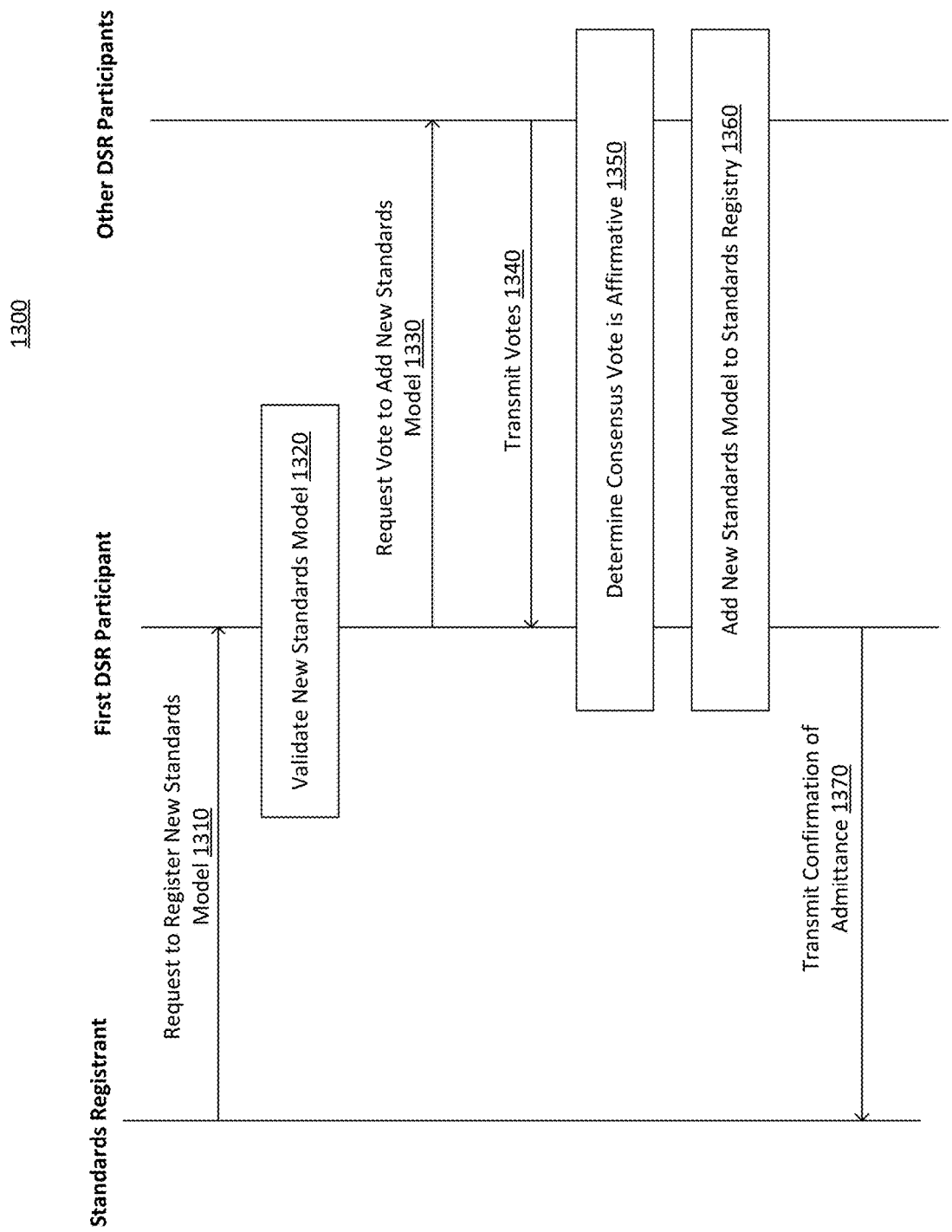
FIG. 13 is a workflow for registering an ontology model with a DSR cluster, according to one embodiment described herein.

FIG. 13 is a workflow for registering an ontology model with a DSR cluster, according to one embodiment described herein. As shown, the workflow 1300 begins at operation 1310, where a standards registrant transmits a request to a first DSR participant, requesting to register a new standards model with a DSR. For example, the standards registrant could be an academic institution, a research organization or more generally any entity interested in registering a standard with a DSR. Upon receiving the request, the first DSR participant validates the new standards model (operation 1320). The first DSR participant, upon successfully validating the new standards model, initiates a vote with the other DSR participants on whether to register the new standard (operation 1330) and the other DSR participants provide their respective votes to one another (operation 1340).

In the depicted embodiment, the DSR participants determine that the consensus of the vote was affirmative to register the new standards model (operation 1350). As a result, the DSR participants add the new standards model to the standards registry of the DSR (operation 1360). The first DSR participant additionally transmits a confirm to the standards registrant, confirming that the new standards model was successfully added to the standards registry of the DSR.

Figure 14:
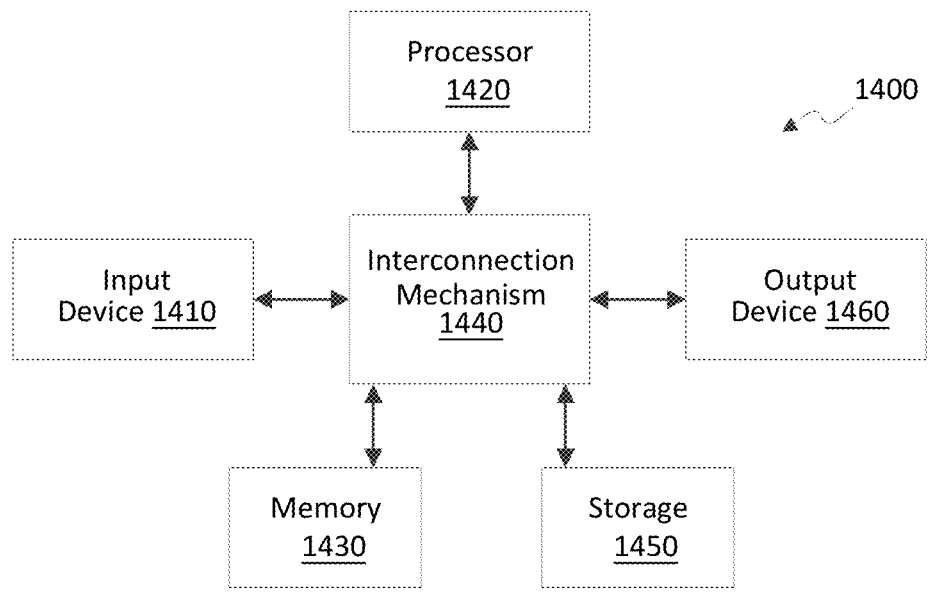
FIG. 14 is a functional block diagram of a general-purpose computer system that may be used to implement various embodiments of this disclosure.

FIG. 14 illustrates an exemplary computing system that may be used to implement various embodiments of this disclosure. In general, any general-purpose computer systems used in various embodiments of this disclosure may be, for example, general-purpose computers such as those based on Intel® Pentium-type processor, Motorola® PowerPC, Sun® UltraSPARC®, Hewlett-Packard® PA-RISC processors, or any other type of processor. Such computer systems may be either physical or virtual.

For example, various embodiments of the disclosure may be implemented as specialized software executing in a general-purpose computer system 1400 such as that shown in FIG. 14. The computer system 1400 may include a processor 1420 connected to one or more memory devices 1430, such as a disk drive, memory, or other device for storing data. Memory 1430 is typically used for storing programs and data during operation of the computer system 1400. The computer system 1400 may also include a storage system 1450 that provides additional storage capacity. Components of computer system 1400 may be coupled by an interconnection mechanism 1440, which may include one or more busses (e.g., between components that are integrated within the same machine) and/or a network (e.g., between components that reside on separate discrete machines). The interconnection mechanism 1440 enables communications (e.g., data, instructions) to be exchanged between system components of system 1400.

Computer system 1400 also includes one or more input devices 1410, for example, a keyboard, mouse, trackball, microphone, touch screen, and one or more output devices 1460, for example, a printing device, display screen, speaker. In addition, computer system 1400 may contain one or more interfaces (not shown) that connect computer system 1400 to a communication network (in addition or as an alternative to the interconnection mechanism 1440).

Figure 15:
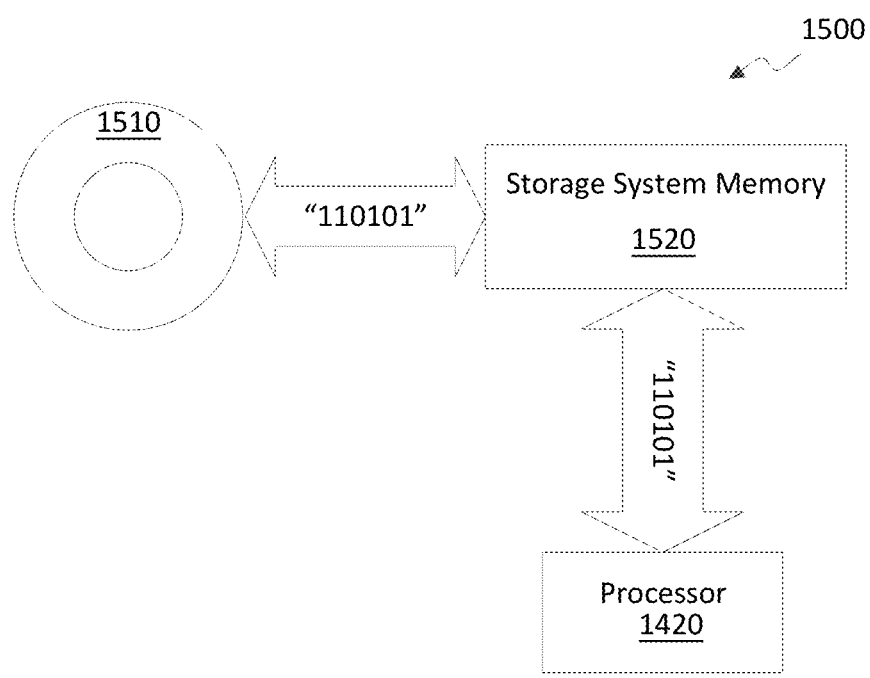
FIG. 15 is a functional block diagram of a general-purpose storage system that may be used to implement various embodiments of this disclosure.

The storage system 1450, shown in greater detail in FIG. 15, typically includes a computer readable and writeable nonvolatile recording medium 1510 in which signals are stored that define a program to be executed by the processor 1420 or information stored on or in the medium 1510 to be processed by the program to perform one or more functions associated with embodiments described herein. The medium may, for example, be a disk or flash memory. Typically, in operation, the processor 1420 causes data to be read from the nonvolatile recording medium 1510 into storage system memory 1520 that allows for faster access to the information by the processor than does the medium 1510. This storage system memory 1520 is typically a volatile, random access memory such as a dynamic random-access memory (DRAM) or static memory (SRAM). This storage system memory 1520 may be located in storage system 1450, as shown, or in the system memory 1430. The processor 1420 generally manipulates the data within the memory system 1520 and then copies the data to the medium 1510 after processing is completed. A variety of mechanisms are known for managing data movement between the medium 1510 and the integrated circuit memory element 1520, and the disclosure is not limited thereto. The disclosure is not limited to a particular memory 1520, memory 1430 or storage system 1450.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 1400 is shown by way of example as one type of computer system upon which various aspects of the disclosure may be practiced, it should be appreciated that aspects of the disclosure are not limited to being implemented on the computer system as shown in FIG. 14. Various aspects of the disclosure may be practiced on one or more computers having a different architecture or components shown in FIG. 14. Further, where functions or processes of embodiments of the disclosure are described herein (or in the claims) as being performed on a processor or controller, such description is intended to include systems that use more than one processor or controller to perform the functions.

Computer system 1400 may be a general-purpose computer system that is programmable using a high-level computer programming language. Computer system 1400 may be also implemented using specially programmed, special purpose hardware. In computer system 1400, processor 1420 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It will be appreciated that the development of an actual commercial application incorporating aspects of the disclosed embodiments will require many implementation specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e., "including but not limited to."

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, Fortran, Cobol, TCL, or Lua. Various aspects of the disclosure may be implemented in a non-programmed environment (e.g., analytics platforms, or documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system for providing a distributed standards registry for a federated computing environment, comprising:
   a plurality of distributed standards registry participants that are collectively configured to provide control logic for the distributed standards registry to make control decisions, wherein the plurality of distributed standards registry participants are configured to maintain a synchronized copy of a distributed ontology model library comprising a plurality of ontology models, wherein a first ontology model of the plurality of ontology models comprises ontological data that describes federation services based on relationships between components of the federated computing environment; and
   a distributed federation broker registry maintained across the plurality of distributed standards registry participants and storing registration information for a plurality of federation brokers providing brokerage services related to at least one federation service described by the plurality of ontology models, wherein a first distributed standards registry participant of the plurality of distributed standards registry participants further comprises:

a discovery processor operable to receive and process queries from potential federation participants using a first at least one ontology model from the plurality of ontology models; and a registry processor operable to receive and process registration requests from potential federation brokers using a second at least one ontology model of the plurality of ontology models.

2. The system of claim 1, wherein the plurality of distributed standards registry participants is configured to maintain the distributed ontology model library and the distributed federation broker registry using a peer-to-peer (P2P) clustering and distribution system, and wherein the P2P clustering and distribution system further comprises at least one of a replicated storage mechanism and a distributed storage mechanism.

3. The system of claim 2, wherein the replicated storage mechanism further comprises a Blockchain system, and wherein the distributed storage mechanism further comprises a Distributed Hash Table (DHT) system.

4. The system of claim 1, wherein the first distributed standards registry participant further comprises a trust management module operable to validate the federation broker before registration information for the federation broker is stored on the federation broker registry.

5. The system of claim 1, wherein the first distributed standards registry participant further comprises a monetization management module operable to receive payment from the federation broker before registration information for the federation broker is stored on the federation broker registry, and wherein the monetization management module is further operable to receive payment from the federation participant before the federation participant receives brokerage services related to a federation service described by one of the plurality of ontology models.

6. The system of claim 1, wherein the registry processor is further operable to:

receive one or more new ontology models from the federation participant or federation broker;

validate the one or more new ontology models to verify that the one or more new ontology models have a required data structure and use a required semantic language; and upon successfully validating the one or more new ontology models, store the one or more new ontology models in the distributed ontology model library, such that a copy of the one or more new ontology models is stored on each of the plurality of distributed standards registry participants.

7. A method of implementing a federated computing environment, comprising:

receiving a federation participant query that includes semantic query data;

querying a distributed standards model library based on processing the semantic query data;

querying a distributed federation broker registry to determine a federation broker that brokers at least one federation service described by at least one standards model; and upon successfully validating the federation broker by verifying a security certificate thereof, facilitating brokerage service related to the at least one federation service from the federation broker to the federation participant by allowing the federation participant to request the at least one federation service from the federation broker.

8. The method according to claim 7, further comprising validating the federation participant by the first distributed standards registry participant before facilitating brokerage service related to the at least one federation service from the federation broker to the federation participant.

9. The method according to claim 7, further comprising facilitating, by the first distributed standards registry participant, payment from the federation participant to at least one federation broker, before facilitating brokerage service related to the at least one federation service from the federation broker to the federation participant.

10. The method according to claim 7, wherein the federation participant is a first federation participant and the at least one federation service is provided by a second federation participant, further comprising facilitating, by the first distributed standards registry participant, payment from the federation participant to the second federation participant.

11. The method according to claim 10, further comprising receiving, by the first distributed standards registry participant, one or more new standards models from one or more of the federation broker, the first federation participant, the second federation participant, or a non-federation-participant, and storing the one or more new standards models by the first distributed standards registry participant.

12. The method according to claim 7, further comprising receiving, by the first distributed standards registry participant, registration information for one or more new federation brokers and storing the registration information by the first distributed standards registry participant.

13. The method according to claim 7, further comprising ranking the at least one standards model based on one or more ranking criteria, including user reviews, quality of service, and service pricing.

14. A system for implementing a federated computing environment, comprising:

one or more computer processors; and a memory containing computer program code that, when executed by operation of the one or more computer processors, performs an operation comprising:

registering a new standards model with a first distributed standards registry participant of a plurality of distributed standards registry participants;

registering, with the first distributed standards registry participant, as a federation broker for the new standards model;

upon receiving a request for a federation service from a federation participant, validating that the federation participant is a legitimate federation participant by validating an identity of the federation participant; and upon successful validation of the federation participant, facilitating brokering of the requested federation service for the federation participant by allowing the federation participant to request the at least one federation service from the federation broker.

15. The system according to claim 14, wherein the operation further comprises submitting a query to the distributed standards model library of the distributed standards registry, the query including semantic query data describing a given standards model of interest.

16. The system according to claim 14, wherein the operation further comprises requesting, through the meta federation broker, payment from the federation participant for the requested federation service before brokering the requested federation service.

17. The system according to claim 14, wherein the federation participant is a first federation participant and the requested federation service is provided by a second federation participant.

18. The system according to claim 14, wherein the requested federation service is one of: Software as a Service (SaaS), Data Storage as a Service (DaaS), Infrastructure as a Service (IaaS), Platform as a Service (PaaS), and wherein the federation broker is one of: an identity federation broker, a storage federation broker, a compute federation broker, a messaging federation broker, and an Internet of Things (IoT) federation broker.

19. A method of implementing a federated computing environment, comprising:
    requesting a standards model that describes federation services using relationships between components of the federated cloud computing environment;
    identifying, from a distributed federation broker registry, a federation broker that brokers a federation service described in the standards model;
    negotiating pricing and monetary terms for provisioning of the federation service with the federation broker; and
    receiving, from the federation broker, brokerage service related to the federation service.

20. The method according to claim 19, wherein requesting a standards model from the first distributed standards registry participant comprises submitting a query that includes semantic query data describing the standards model, and further comprising:
    submitting payment to the federation broker before receiving the brokerage service related to the federation service from the federation broker;
    providing user review of at least one of (i) the federation service and (ii) the provisioning of the federation service, through the first distributed standards registry participant; and
    requesting a list of federation brokers that provide a given federation service.

* * * * *